(12) United States Patent
Nishimura et al.

(10) Patent No.: US 8,950,244 B2
(45) Date of Patent: Feb. 10, 2015

(54) EVAPORATION SYSTEM LEAK DIAGNOSTIC APPARATUS

(75) Inventors: Yusaku Nishimura, Toyota (JP);
Yoshihide Ogawa, Toyota (JP);
Kazuhiro Minamitani, Toyota (JP);
Satoshi Kawai, Toyota (JP); Toshio Douke, Toyota (JP); Yoshinori Ogaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 363 days.

(21) Appl. No.: 13/351,074

(22) Filed: Jan. 16, 2012

(65) Prior Publication Data

US 2012/0186333 A1    Jul. 26, 2012

(30) Foreign Application Priority Data

Jan. 20, 2011    (JP) .................................. 2011-009990

(51) Int. Cl.
*G01M 3/32* (2006.01)
*G01M 3/26* (2006.01)
*F02M 25/08* (2006.01)

(52) U.S. Cl.
CPC ......... *G01M 3/3263* (2013.01); *F02M 25/0818* (2013.01); *F02M 25/0809* (2013.01)
USPC ............................................. 73/47; 73/49.7

(58) Field of Classification Search
CPC ....... G01M 3/26; G01M 3/226; G01M 3/025; G01M 3/3263; G01M 3/32; F02D 41/0032; F02D 19/0623; F02D 2041/224; F02D 2041/225
USPC .......................... 73/40, 40.5 R, 47, 49.4, 49.7
See application file for complete search history.

(56) References Cited

U.S. PATENT DOCUMENTS

| | | | | |
|---|---|---|---|---|
| 5,333,589 | A | * | 8/1994 | Otsuka .......................... 123/520 |
| 5,396,873 | A | | 3/1995 | Yamanaka et al. |
| 5,616,836 | A | * | 4/1997 | Blomquist et al. ......... 73/114.39 |
| 5,671,718 | A | * | 9/1997 | Curran et al. .................. 123/520 |
| 5,679,890 | A | * | 10/1997 | Shinohara et al. .......... 73/114.39 |
| 5,996,400 | A | * | 12/1999 | Nishioka et al. ........... 73/40.5 R |
| 6,016,690 | A | * | 1/2000 | Cook et al. ...................... 73/49.2 |
| 6,044,314 | A | * | 3/2000 | Cook et al. .................... 701/32.8 |

(Continued)

FOREIGN PATENT DOCUMENTS

| | | |
|---|---|---|
| JP | 06288307 A | 10/1994 |
| JP | 07012015 A | 1/1995 |

(Continued)

*Primary Examiner* — David A Rogers
(74) *Attorney, Agent, or Firm* — Gifford, Krass, Sprinkle, Anderson & Citkowski, P.C.

(57) ABSTRACT

An evaporation system leak diagnostic apparatus that purges fuel vapor from a fuel tank into an intake system of an internal combustion engine via a canister, includes: a first closed system leak diagnostic unit that executes a leak diagnostic on a first closed system based on a tank internal pressure detected by a tank internal pressure detecting device while the first closed system is formed with a first closed system forming device; and a second closed system leak diagnostic unit that introduces pressure in the first closed system into a second closed system by forming a second closed system with a second closed system forming device, and executes a leak diagnostic on the second closed system based on the tank internal pressure detected by the tank internal pressure detecting device, after the leak diagnostic by the first closed system leak diagnostic unit.

14 Claims, 15 Drawing Sheets

(56) References Cited

U.S. PATENT DOCUMENTS

| | | | |
|---|---|---|---|
| 6,148,803 A * | 11/2000 | Majima et al. | 123/520 |
| 6,220,229 B1 * | 4/2001 | Kawamura et al. | 123/520 |
| 6,227,037 B1 | 5/2001 | Kawamura et al. | |
| 6,283,098 B1 * | 9/2001 | Corkill | 123/520 |
| 6,334,355 B1 * | 1/2002 | Grieve et al. | 73/49.7 |
| 6,354,143 B1 | 3/2002 | Isobe et al. | |
| 6,382,017 B1 * | 5/2002 | Majkowski et al. | 73/49.7 |
| 6,405,718 B1 * | 6/2002 | Yoshioka et al. | 123/520 |
| 6,557,401 B2 * | 5/2003 | Ito | 73/114.39 |
| 6,666,072 B2 * | 12/2003 | Hirano et al. | 73/49.7 |
| 6,679,230 B2 * | 1/2004 | Kanai et al. | 123/520 |
| 6,701,777 B2 * | 3/2004 | Yamaguchi et al. | 73/49.7 |
| 6,761,154 B2 * | 7/2004 | Takagi et al. | 123/520 |
| 6,769,419 B2 * | 8/2004 | Kanai et al. | 123/520 |
| 6,789,523 B2 * | 9/2004 | Oki et al. | 123/198 D |
| 6,892,712 B2 * | 5/2005 | Miwa et al. | 123/520 |
| 7,168,302 B2 * | 1/2007 | Nakoji | 73/114.39 |
| 7,231,813 B2 * | 6/2007 | Kato et al. | 73/47 |
| 7,360,401 B2 * | 4/2008 | Kano | 73/47 |
| 7,448,367 B1 * | 11/2008 | Reddy et al. | 123/520 |
| 7,594,427 B2 * | 9/2009 | Ardash | 73/49.7 |
| 7,762,126 B2 * | 7/2010 | Shibuya | 73/114.39 |
| RE41,823 E * | 10/2010 | Miwa et al. | 123/520 |
| 8,019,525 B2 * | 9/2011 | DeBastos et al. | 701/102 |
| 8,033,271 B2 * | 10/2011 | Yoshimura | 123/520 |
| 8,155,917 B2 * | 4/2012 | Maegawa | 702/140 |
| 8,560,167 B2 * | 10/2013 | Jentz et al. | 701/32.7 |
| 2005/0011499 A1 * | 1/2005 | Hara et al. | 123/520 |
| 2005/0044931 A1 * | 3/2005 | Ohhashi et al. | 73/46 |
| 2006/0086343 A1 * | 4/2006 | Suzuki | 123/520 |
| 2009/0211340 A1 * | 8/2009 | Wang et al. | 73/40.7 |
| 2009/0277251 A1 * | 11/2009 | Takakura | 73/40.7 |
| 2010/0229966 A1 * | 9/2010 | Elwart et al. | 137/485 |
| 2011/0295482 A1 * | 12/2011 | Pearce et al. | 701/102 |

FOREIGN PATENT DOCUMENTS

| | | |
|---|---|---|
| JP | 11-303693 A | 11/1999 |
| JP | 2000-227053 A | 8/2000 |
| JP | 2002-004958 A | 1/2002 |
| JP | 2003-148257 A | 5/2003 |
| JP | 2004-011561 A | 1/2004 |
| JP | 2004-308493 A | 11/2004 |

* cited by examiner

EVAPORATION SYSTEM LEAK DIAGNOSTIC APPARATUS

CROSS-REFERENCE TO RELATED APPLICATION(S)

This application claims priority to Japanese Patent Application No. 2011-009990 filed on Jan. 20, 2011, which is incorporated herein by reference in its entirety including the specification, drawings and abstract.

BACKGROUND OF THE INVENTION

1. Field of the Invention

The invention relates to an evaporation system leak diagnostic apparatus that purges fuel vapor from a fuel tank to an intake system of an internal combustion engine via a canister.

2. Description of Related Art

One known evaporation system uses a canister to adsorb fuel vapor and then purges the fuel vapor adsorbed in the canister into an intake passage of an internal combustion engine at a suitable timing, in order to prevent fuel vapor produced in a fuel tank from being released into the atmosphere. If there is an abnormality such as a hole in the evaporation system, fuel vapor may leak out into the atmosphere.

Japanese Patent Application Publication No. 2004-308493 (JP-A-2004-308493), Japanese Patent Application Publication No. 2004-11561 (JP-A-2004-11561), and Japanese Patent Application Publication No. 2002-4958 (JP-A-2002-4958) describe evaporation system diagnostic apparatuses that diagnose a leak abnormality in the evaporation system in order to counter a fuel vapor leak abnormality. In JP-A-2004-308493, when diagnosing a leak, a closed system of only a fuel tank or a closed system of an entire evaporation system is formed, and the internal pressure of the fuel tank in a closed state is measured. It is determined that there is a leak abnormality in the fuel tank when the frequency with which the internal pressure measurement value is a value near atmospheric pressure is high, or the number of times that the internal pressure measurement value is a value near atmospheric pressure is large.

In JP-A-2004-11561, an electric pump is driven to pressurize the canister. Alternatively, intake negative pressure generated by operation of the internal combustion engine is introduced into the canister. Then the internal pressure of the canister is detected by a first pressure sensor, and a leak diagnostic is performed on the canister from the converged state of this pressure.

Moreover, after the leak diagnostic on the canister, the canister and the fuel tank are communicated, and the communicated space is pressurized by an electric pump provided on the canister side. Alternatively, intake negative pressure generated when the internal combustion engine is operated is introduced into the communicated space from the intake system via the canister. Then the internal pressure of the fuel tank is detected by a second pressure sensor, or the fuel tank internal pressure is introduced via a three-way valve and detected by the first pressure sensor, and a leak diagnostic is performed on the space (essentially a portion of the fuel tank) from the converged state of the pressure.

In JP-A-2004-11561, a leak diagnostic is performed on both the canister and the fuel tank using intake negative pressure generated when the internal combustion engine is operating and positive pressure that is actively created. In JP-A-2002-4958, intake negative pressure generated when the internal combustion engine is operating is introduced into only a canister, and a leak diagnostic is performed based on a change in the internal pressure of the canister. Moreover, the intake negative pressure generated when the internal combustion engine is operating is introduced into the fuel tank via the canister, and then the fuel tank is closed off from the canister, so as to form a closed space of only the fuel tank. A leak diagnostic is then performed based on a change in the internal pressure of the fuel tank in the closed off state.

In JP-A-2002-4958, the canister and the fuel tank are each placed in closed states, and intake negative pressure is introduced into each separately. Then a separate leak diagnostic is performed on each with a pressure sensor provided in each or with a single pressure sensor by using a three-way valve.

However, with the method described in JP-A-2004-308493, a leak diagnostic is performed only on the fuel tank or only on the combined space of the canister and the fuel tank, so a leak diagnostic distinguishing the fuel tank from the canister is unable to be performed.

In JP-A-2004-11561, a leak diagnostic is performed on the canister, and then a leak diagnostic is performed on the combined space of the canister and the fuel tank. However, with the method described in JP-A-2004-11561, if a pressure increase/decrease mechanism such as a pump is provided in the evaporation system in order to perform a leak diagnostic when the internal combustion engine is stopped, both the weight of the internal combustion engine and the cost increase. Moreover, two pressure sensors are used, which further increases both the weight of the internal combustion engine and the cost. In JP-A-2004-11561 an example is also described in which one pressure sensor is used, but the apparatus requires a separate three-way valve, which inevitably increases the overall complexity, makes the internal combustion engine heavier, and increases the cost.

In JP-A-2002-4958 as well, two pressure sensors are used, which makes the internal combustion engine heavier and increases the cost. Furthermore, in JP-A-2002-4958 as well, an example is described in which a three-way valve and one sensor are used in combination instead of the two pressure sensors, but again, this inevitably makes the internal combustion engine heavier and increases the cost.

JP-A-2004-11561 and JP-A-2002-4958 both describe methods that use intake negative pressure of the internal combustion engine. However, these methods are based on the assumption that the internal combustion engine is constantly operating, and a leak diagnostic is unable to be made when the internal combustion engine is stopped.

SUMMARY OF THE INVENTION

The invention provides an evaporation system leak diagnostic apparatus capable of performing a leak diagnostic distinguishing between a canister and a fuel tank even when an internal combustion engine is stopped, using a single pressure sensor, without adding a pressure increase/decrease mechanism such as a pump or a pressure switching mechanism such as a three-way valve to an evaporation system.

A first aspect of the invention relates to an evaporation system leak diagnostic apparatus that purges fuel vapor from a fuel tank into an intake system of an internal combustion engine via a canister. This evaporation system leak diagnostic apparatus includes a tank internal pressure detecting device that detects a tank internal pressure of the fuel tank; a first closed system forming device that forms a first closed system in which the fuel tank is closed off; a second closed system forming device that forms a second closed system in which the canister and the fuel tank form a combined space that is closed off; a first closed system leak diagnostic unit that executes a leak diagnostic on the first closed system based on the tank internal pressure detected by the tank internal pressure detecting device while the first closed system is formed with the first closed system forming device; and a second closed system leak diagnostic unit that introduces pressure in the first closed system into the second closed system by forming the second closed system with the second closed system forming device, and executes a leak diagnostic on the second closed system based on the tank internal pressure detected by the tank internal pressure detecting device, after the leak diagnostic by the first closed system leak diagnostic unit.

The first closed system leak diagnostic unit executes a leak diagnostic on the first closed system based on the tank internal pressure in the fuel tank. The pressure of gas sealed inside of the first closed system, as well as the fuel vapor pressure, fluctuates due to changes in the temperature as a result of heat being transferred to and from the outside while the fuel tank is closed off as the first closed system. As a result of this fluctuation, the tank internal pressure detected by the tank internal pressure detecting device will naturally fluctuate largely even if positive pressure or negative pressure is not introduced from the outside into the first closed system.

For example, the temperature of the fuel tank may rise from the residual heat of the internal combustion engine after the internal combustion engine is stopped. If the temperature of the fuel tank rises, the tank internal pressure in the fuel tank in a closed off state will become sufficiently higher than atmospheric pressure due to the rise in vapor pressure or the rise in pressure of gas that is sealed in.

Thereafter, if the fuel tank in a closed off state cools due to the internal combustion engine being stopped for an extended period of time, the fuel vapor pressure will decrease or the pressure of the gas that is sealed in will drop, so the tank internal pressure inside the fuel tank that is in a closed off state will be sufficiently lower than atmospheric pressure and thus be a negative pressure.

Therefore, even if the internal combustion engine is stopped such that intake negative pressure is not able to be used, or even if the pressure is not increased or decreased by a pump, sufficient differential pressure is able to be provided between the first closed system and the outside air side simply by forming the first closed system with the first closed system forming device when the internal combustion engine is stopped. The differential pressure appears in the tank internal pressure detected by the tank internal pressure detecting device.

Therefore, even if the first closed system is formed with the first closed system forming device, if there is not sufficient differential pressure between the first closed system and the outside air side, it is evident that there is a leak in the first closed system.

The first closed system leak diagnostic unit is able to accurately execute a leak diagnostic on the first closed system based on the tank internal pressure. After the leak diagnostic by the first closed system leak diagnostic unit, the second closed system leak diagnostic unit switches from the first closed system to the second closed system and executes a leak diagnostic on the second closed system based on the tank internal pressure. The second closed system is formed by the canister and the fuel tank forming a combined space that is closed off. When the second closed system is formed, the pressure inside of the first closed system, in which there is sufficient differential pressure with respect to atmospheric pressure as long as there is no leak abnormality in the first closed system as described above, is introduced into the second closed system.

Here, the fuel tank has a sufficiently larger capacity than the canister. Therefore, pressure (i.e., positive pressure or negative pressure) introduced from the first closed system into the second closed system is created by the flow of gas from the large volume space into the small volume space. That is, a flow of gas is created between the first closed system that is a large capacity space that is mainly the capacity of the fuel tank, and the small capacity space that is mainly the capacity of the canister. Accordingly, even if the spatial capacity increases from the first closed system to the second closed system, there will not be a large pressure change with the overall second closed system. That is, even if the canister is at atmospheric pressure until right before, it will not greatly affect the pressure on the fuel tank side that is the large capacity space. Therefore, even if there is a switch to the second closed system in which the space inside fuel tank is combined (i.e., communicated) with the space inside the canister, the internal pressure of the second closed system is able to sufficiently ensure differential pressure with respect to the atmospheric pressure side.

Therefore, if there is no leak in the second closed system, there will be a sufficient difference between the tank internal pressure detected by the tank internal pressure detecting device and atmospheric pressure. Thus, if there is a sufficient difference between the tank internal pressure and atmospheric pressure as a result of the second closed system leak diagnostic unit switching from the first closed system to the second closed system, it is evident that there is not a leak in the second closed system. If there is not a sufficient difference, it is evident that there is a leak in the second closed system. The leaking portion if there is not a sufficient difference is the portion made up mainly of the canister that is added when the switch is made from the first closed system to the second closed system, in particular.

The second closed system leak diagnostic unit is also able to accurately execute a leak diagnostic on the second closed system based on the tank internal pressure. Also, as described above, the leak diagnostic on the second closed system may be a leak diagnostic on the canister that is distinguished from the fuel tank, based on the results of the leak diagnostic on the first closed system performed earlier.

According to the aspect described above, it is possible to perform a leak diagnostic distinguishing between a canister and a fuel tank even when an internal combustion engine is stopped, using a single pressure sensor (in this case, a single tank internal pressure detecting device), without adding a pressure increase/decrease mechanism such as a pump or a pressure switching mechanism such as a three-way valve to an evaporation system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

[First Example Embodiment]
(Structure)

Figure 1:
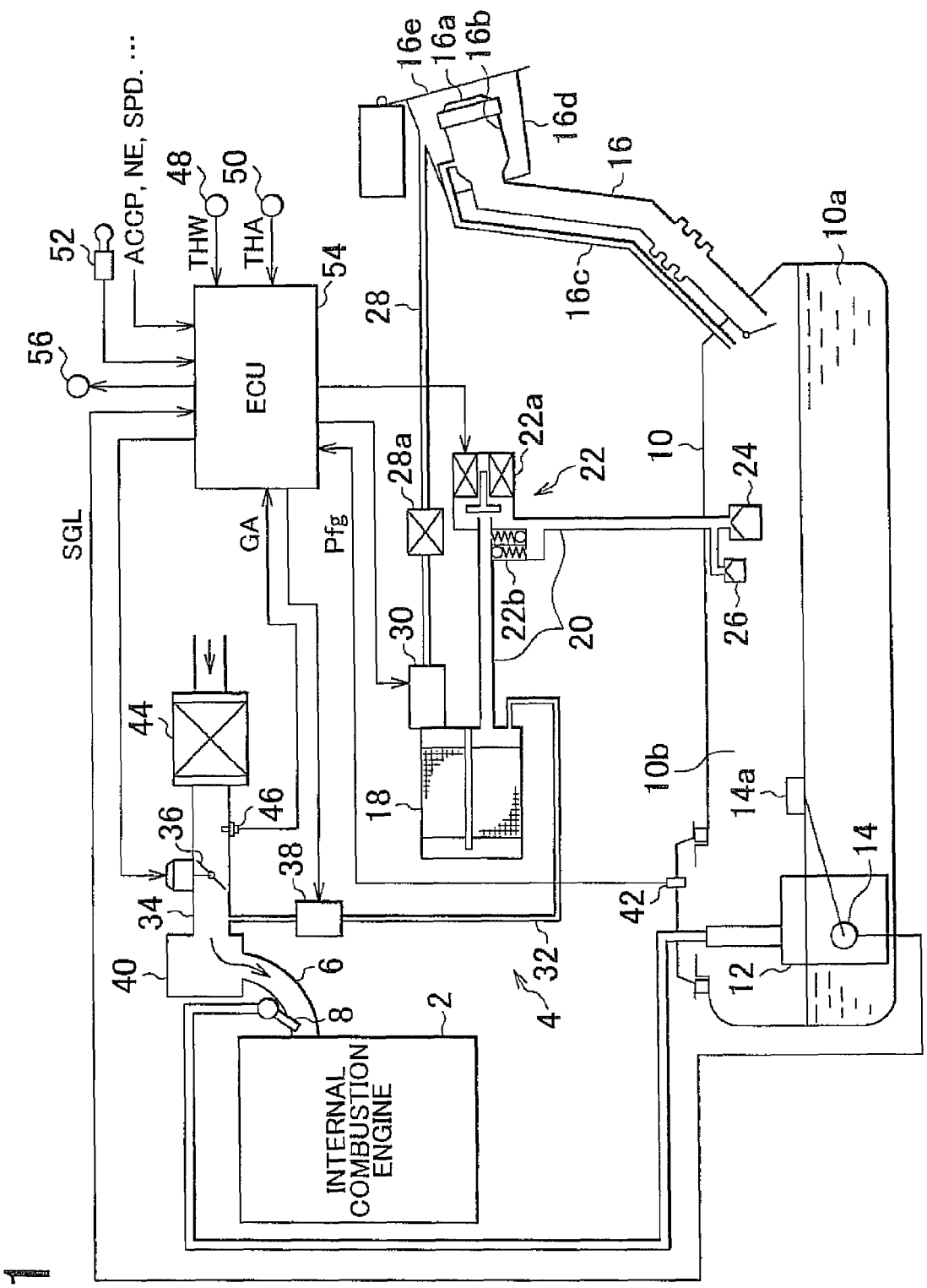
FIG. 1 is a schematic diagram of an evaporation system, and a control system thereof, of an internal combustion engine according to a first example embodiment of the invention.

FIG. 1 is a schematic diagram of an evaporation system 4, and a control system thereof, of an internal combustion engine 2 to which the invention described above has been applied. The internal combustion engine 2 is a gasoline engine that is mounted in a vehicle to drive the vehicle. Rotational output of the internal combustion engine 2 is transmitted to driving wheels of the vehicle via a transmission. The vehicle may be a vehicle that uses the internal combustion engine 2 as the sole driving source, or a hybrid vehicle that uses an electric motor in addition to the internal combustion engine 2 as the driving source.

A fuel injection valve 8 is arranged in an intake port 6 of each cylinder provided in the internal combustion engine 2. Fuel stored in a fuel tank 10 is delivered to the fuel injection valve 8 by a fuel pump module 12. This fuel is then injected into intake air from the fuel injection valve 8 at a predetermined timing by performing fuel injection control. The injected fuel is drawn into the cylinders and combusted. The force generated by the combustion of the fuel drives the internal combustion engine 2.

A fuel sender gauge 14 is provided inside the fuel tank 10. The fuel sender gauge 14 includes a float 14a. The float 14a floats on the surface of liquid fuel 10a. Therefore, the fuel sender gauge 14 is able to detect the fuel level in the fuel tank 10 based on the position of the float 14a.

A fuel inlet pipe 16 is provided to introduce fuel into the fuel tank 10 when fueling. A filler port 16b to which a cap 16a is attached is provided on a tip end of the fuel inlet pipe 16.

A circulation pipe 16c connects the filler port 16b with an upper space 10b of the fuel tank 10. A fuel inlet box 16d is formed around the filler port 16b. A fuel lid 16e is provided on a front surface of the fuel inlet box 16d. The fuel lid 16e is open when fueling.

A canister 18 is connected to the upper space 10b of the fuel tank 10 via a discharge passage 20. Fuel vapor is discharged from the upper space 10b of the fuel tank 10 to the canister 18 side via the discharge passage 20. The canister 18 has adsorbent material such as active carbon that adsorbs fuel inside of it.

A stop valve unit 22 is provided midway in the discharge passage 20. The stop valve unit 22 includes a stop valve 22a and a relief valve 22b. The stop valve 22a is an electromagnetic valve that is switched between open and closed. The stop valve 22a is open when energized (ON) and closed when de-energized (OFF).

When the stop valve 22a is open, the fuel tank 10 and the canister 18 are communicated via the discharge passage 20. This communication enables fuel vapor produced in the upper space 10b of the fuel tank 10 to be discharged to the canister 18 side.

When the stop valve 22a is closed, the discharge passage 20 is closed off. Closing off the discharge passage 20 prevents fuel vapor produced in the upper space 10b of the fuel tank 10 from being discharged to the canister 18 side. That is, the upper space 10b of the fuel tank 10 is hermetically sealed and is thus air-tight, such that a first closed system is formed.

When the difference between the pressure inside of the discharge passage 20 on the fuel tank 10 side and the pressure of the discharge passage 20 on the canister 18 side becomes excessive, the relief valve 22b opens to relieve this excessive differential pressure.

An ORVR (On-Board Refueling Vapor Recovery) valve 24 and a rollover valve 26 are provided in a portion of the discharge passage 20 that opens into the fuel tank 10. The ORVR valve 24 opens when the pressure of the upper space 10b rises due to a rise in the level of the fuel inside the fuel tank 10 following fueling. When the ORVR valve 24 opens, fuel vapor inside the upper space 10b is delivered to the canister 18 side via the discharge passage 20. Having the fuel vapor be delivered to the canister 18 side in this way inhibits fuel vapor from being released into the atmosphere from the fuel inlet pipe 16 and the circulation pipe 16c during fueling. The rollover valve 26 opens when the vehicle is greatly inclined. Having the rollover valve 26 open prevents liquid fuel from leaking outside.

Normally (i.e., when at least one of the ORVR valve 24 and the rollover valve 26 is open and the relief valve 22b is closed), when the stop valve 22a opens, fuel vapor inside the upper space 10b of the fuel tank 10 is discharged to the canister 18 side via the discharge passage 20. When fuel vapor is discharged, fuel vapor produced inside the fuel tank 10 is absorbed by the adsorbent material inside the canister 18.

An outside air introduction passage 28 connects the canister 18 with the fuel inlet box 16d. This connection communicates the internal space of the canister 18 with the internal space of the fuel inlet box 16d.

An air filter 28a is provided midway in the outside air introduction passage 28. Moreover, a CCV (Canister Closing Valve) 30 formed as an electromagnetic valve that is switched between a state that closes off the air introduction passage 28 (i.e., closed) and a state that opens the air introduction passage 28 (i.e., open) is provided in a position on the canister 18 side of the air filter 28a, in the outside air introduction passage 28. This CCV 30 is open when de-energized (OFF), and closed when energized (ON).

A purge passage 32 connects the canister 18 with an intake passage 34. The purge passage 32 is connected to the intake passage 34 downstream of a throttle valve 36. A purge control valve 38 is arranged midway in the purge passage 32. The purge control valve 38 is an electromagnetic valve of which the opening amount is adjusted by duty control. The amount of fuel vapor that is purged from the canister 18 side into the intake air via the purge passage 32 (i.e., the purge amount) is regulated by duty control.

That is, the fuel vapor that is released from the adsorbent material of the canister 18 is released into the intake air that flows through the intake passage 34, via the purge passage 32 according to the opening amount of the purge control valve 38. The intake air in the purged fuel that flows from the intake passage 34 into a surge tank 40 by this release is distributed to the intake ports 6 of the cylinders and combusted inside the combustion chamber of each cylinder together with the fuel from the fuel injection valve 8.

When the CCV 30 and the purge control valve 38 are closed and the stop valve 22*a* is open, the canister 18 and the fuel tank 10 form a combined space that is closed off, thus forming a second closed system in the evaporation system 4.

A tank internal pressure sensor 42 that serves as a pressure sensor that detects the pressure (i.e., the tank internal pressure Pfg) in the upper space 10*b* is provided in the fuel tank 10. Here, this tank internal pressure sensor 42 detects the pressure with respect to an atmospheric air pressure reference, i.e., the differential pressure with respect to the atmospheric air pressure, and outputs it as the tank internal pressure Pfg.

An air filter 44 is provided on the upstream side in the intake passage 34, and an airflow meter 46 is provided between the air filter 44 and the throttle valve 36 in the intake passage 34. The airflow meter 46 detects an intake air amount GA (g/sec) drawn into the internal combustion engine 2.

Furthermore, a coolant temperature sensor 48 that detects a coolant temperature THW that is the temperature of coolant in the internal combustion engine 2, an intake air temperature sensor 50 that detects an intake air temperature THA that is the temperature of intake air in the intake passage 34, an ignition switch (IGSW) 52, and other sensors and switches are provided and output signals, respectively. Some examples of signals output from the other sensors are an accelerator operation amount ACCP signal from an accelerator operation amount sensor that detects the operation amount of an accelerator pedal operated by a driver of the vehicle, an engine speed NE signal from an engine speed sensor that detects a crankshaft rotation speed of the internal combustion engine 2, and a vehicle speed SPD signal from a vehicle speed sensor.

The detection signals from the fuel sender gauge 14, the tank internal pressure sensor 42, the airflow meter 46, the coolant temperature sensor 48, the intake air temperature sensor 50, and the IGSW 52 and the like are received by an electronic control unit (hereinafter, simply referred to as "ECU") 54 that is formed around a microcomputer.

The ECU 54 performs calculations based on the signal data as well as data and programs stored in advance, and controls mechanisms such as the stop valve 22*a*, the CCV 30, the throttle valve 36, and the purge control valve 38. The ECU 54 also executes a leak diagnostic routine that will be described later. If a leak abnormality is discovered through the leak diagnostic routine, a routine is also executed to alert the driver of the vehicle by illuminating a warning lamp 56 on a dashboard or the like, for example.

(Operation) The operation of this example embodiment based on the foregoing structure will be described together with the routine executed by the ECU 54.

In the leak diagnostic routine of the ECU 54, when a precondition is satisfied, first the first closed system described above is formed and a leak diagnostic is performed on the first closed system based on the state of the tank internal pressure Pfg detected by the tank internal pressure sensor 42. If there is no leak abnormality in the first closed system according to the leak diagnostic, the second closed system described above is formed and a leak diagnostic is performed on the second closed system based on the state of the tank internal pressure Pfg detected by the tank internal pressure sensor 42.

Figure 2:
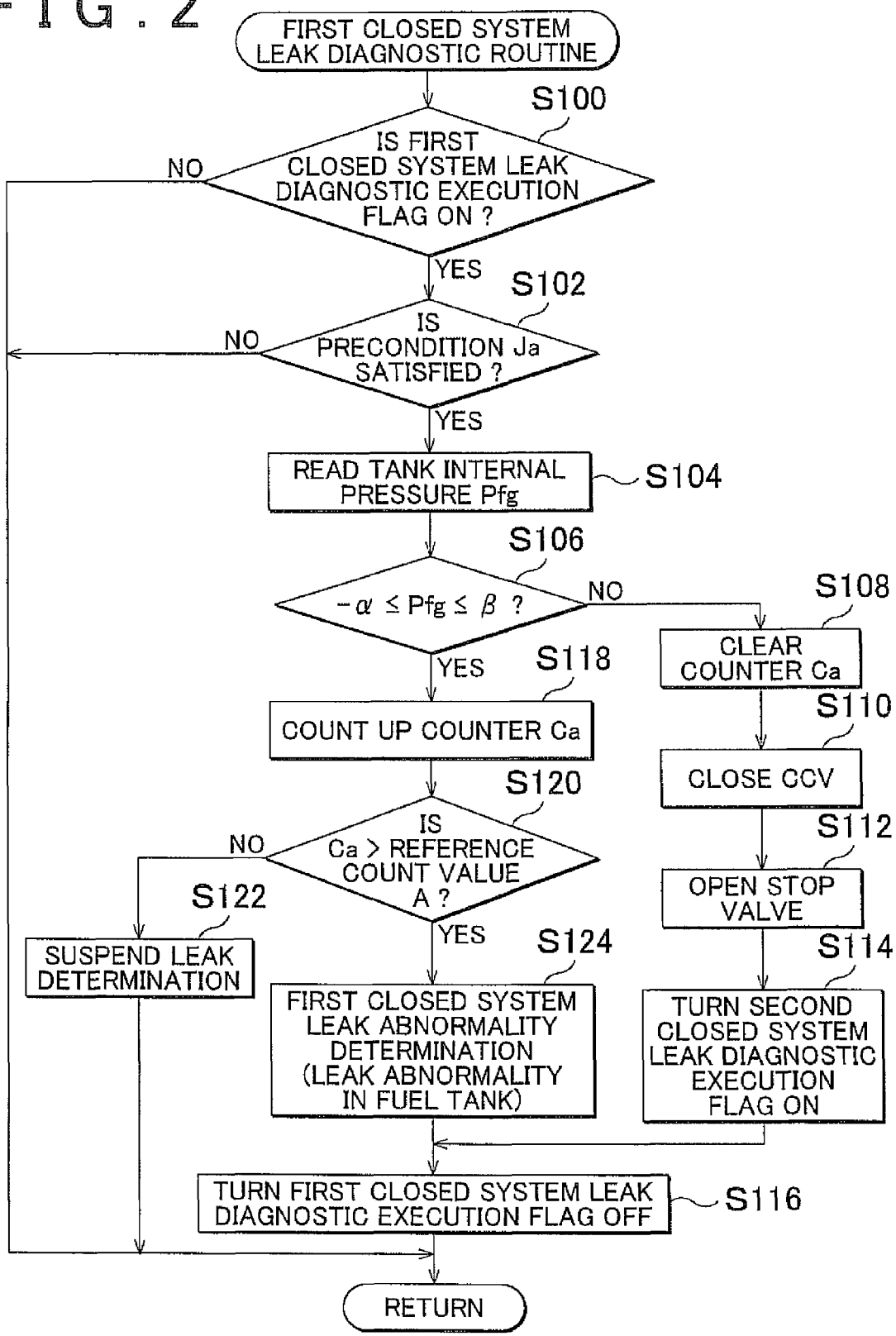
FIG. 2 is a flowchart illustrating a first closed system leak diagnostic routine of the first example embodiment.
Figure 3:
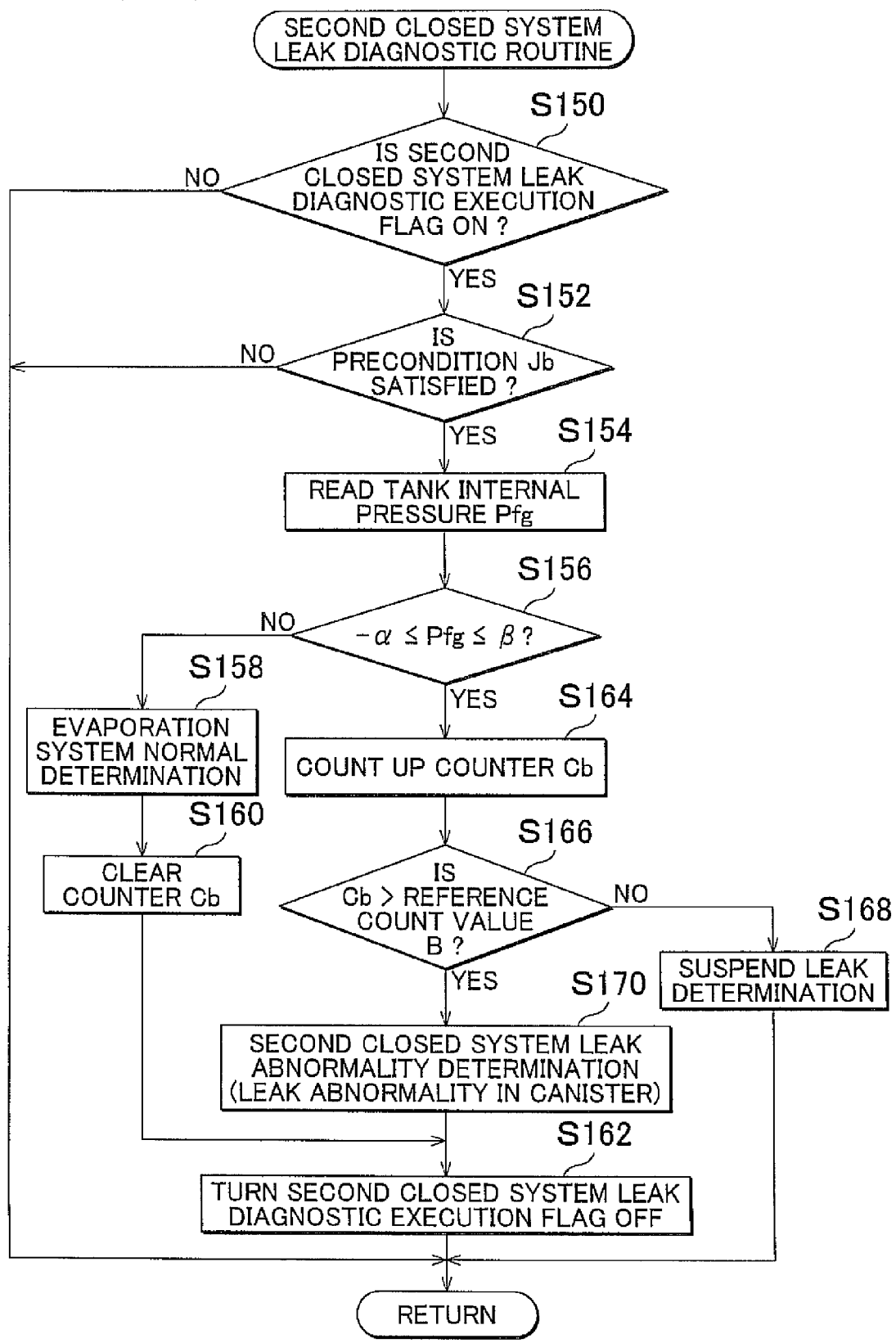
FIG. 3 is a flowchart illustrating a second closed system leak diagnostic routine of the first example embodiment.

The ECU 54 performs the series of leak diagnostics according to a first closed system leak diagnostic routine shown in FIG. 2 and a second closed system leak diagnostic routine shown in FIG. 3. These leak diagnostic routines (FIGS. 2 and 3) are routines that are repeated at regular time cycles.

The first closed system leak diagnostic routine (FIG. 2) executed by the ECU 54 will now be described. In this routine, the ECU 54 first determines whether a first closed system leak diagnostic execution flag is on (S100). Here, the first closed system leak diagnostic execution flag is turned on in the initial setting when the ECU 54 is turned on. Therefore, the determination in step S100 is YES.

Next, the ECU 54 determines whether a precondition Ja for performing a leak diagnostic is satisfied (S102). The precondition Ja is a condition for determining that the production of fuel vapor in the fuel tank 10 is stable. The conditions described below are examples.

Condition 1. Condition 1 is that the IGSW 52 be turned on after the internal combustion engine has been stopped for an extended period of time (equal to or longer than a reference period of time that is set in advance) due to the vehicle being parked or the like, and the current point in time be within a period of time from the timing at which the IGSW 52 is turned on until right before the purge control valve 38 is opened and purging into the intake passage 34 starts. Condition 1 may correspond to "after a reference time has passed while the first closed system is formed with the first closed system forming device, and during a period of time from an on operation of an ignition switch until right before purging is first executed" of the invention.

Condition 2. Condition 2 is that several hours (e.g., five hours) have passed after the IGSW 52 has been turned off and the coolant temperature THW detected by the coolant temperature sensor 48 be equal to or less than a predetermined temperature (such as 35° C.). The intake air temperature THA detected by the intake air temperature sensor 50 may be used instead of the coolant temperature THW. The coolant temperature THW and the intake air temperature THA may correspond to "a temperature that reflects a state of the internal combustion engine" of the invention. The coolant temperature THW and the intake air temperature THA may correspond to "a reference temperature" of the invention. Condition 2 may correspond to a combination of the condition that "the temperature that reflects the state of the internal combustion engine while the ignition switch is off and the first closed system is formed have already reached the reference temperature" of the invention, and the condition that "several hours (e.g., five hours) have passed" of the invention. Condition 2 may also be a condition that the coolant temperature THW detected by the coolant temperature sensor 48 be equal to or less than a predetermined temperature (such as 35° C.), after the IGSW 52 has been turned off. That is, condition 2 may also be a condition that the temperature that reflects the state of the internal combustion engine while the ignition switch is off and the first closed system is formed have already reached the reference temperature.

Condition 1 or condition 2 described above is set as the precondition Ja. The precondition Ja may also be such that condition 1 and condition 2 are OR conditions. If the precondition Ja is not satisfied (i.e., NO in S102), the ECU 54 exits the routine. Hereinafter, the leak diagnostic on the first closed system will not be executed if the precondition Ja is not satisfied (i.e., NO in S102).

If the precondition Ja is satisfied (i.e., YES in S102), the ECU 54 then reads the value of the tank internal pressure Pfg detected by the tank internal pressure sensor 42 to a work area provided in the memory of the ECU 54 (S104).

Then the ECU 54 determines whether the value of the tank internal pressure Pfg is within a region near atmospheric pressure that is set as shown in Expression 1 (S106).

$$-\alpha \le Pfg \le \beta \quad \text{[Expression 1]}$$

In this expression, $\alpha$ represents the fluctuation range from atmospheric pressure to the low pressure side, and $\beta$ is a value that represents the fluctuation range from atmospheric pressure to the high pressure side.

The tank internal pressure sensor 42 detects the differential pressure with respect to atmospheric pressure, so atmospheric pressure is such that tank internal pressure Pfg=0. Therefore, Expression 1 above represents a state in which the tank internal pressure Pfg is within a range between a boundary value ($-\alpha$) on the low pressure side of atmospheric pressure and a boundary value ($\beta$) on the high pressure side of atmospheric pressure.

The region near atmospheric pressure indicated by Expression 1 above indicates the range within which the tank internal pressure Pfg can be reached when there is a leak due to a leak hole or the like in the evaporation system 4 (i.e., the fuel tank 10 in the determination described above), and is set to include the pressure value of atmospheric pressure. Therefore, the boundary value ($-\alpha$) is a boundary value on the negative pressure side when there is a leak, and the boundary value ($\beta$) is the boundary value on the positive pressure side when there is a leak.

The ECU 54 closes the stop valve 22a when the internal combustion engine 2 stops. Accordingly, at the timing at which the precondition Ja is satisfied, the first closed system is already formed, and a certain amount of time has already passed with the fuel tank 10 in the closed off state.

The fuel tank 10 in the closed off state gives off and receives heat to and from the surrounding area, so the temperature of the fuel tank 10 changes from the temperature when the fuel tank 10 is first closed off. For example, when the fuel tank 10 cools through heat dissipation, the temperature of the fuel tank 10 decreases. Or, after the internal combustion engine is stopped, the temperature of the fuel tank 10 rises from the residual heat of the internal combustion engine 2.

When the temperature of the fuel tank 10 in a closed off state decreases, the pressure inside of the fuel tank 10 decreases in response to the temperature decrease. Moreover, with the fuel 10a inside the fuel tank 10 as well, the fuel vapor pressure decreases from the temperature decrease, and the tank internal pressure Pfg exhibits a relatively large decrease. Conversely, when the temperature of the fuel tank 10 increases, the pressure inside the fuel tank 10 increases in response to this temperature increase, and the fuel vapor pressure increases from the increase in the fuel temperature, so the tank internal pressure Pfg exhibits a relatively large increase. As described above, in the closed-off fuel tank 10, the tank internal pressure Pfg exhibits a relatively large change from a decrease and increase in temperature.

However, when there is a leak in the fuel tank 10 that is supposed to be closed off, the leak acts to eliminate the pressure difference with respect to atmospheric pressure, even if the tank internal pressure Pfg wants to decrease or increase due to a temperature change such as that described above. Therefore, a large difference with respect to atmospheric pressure will not occur even if the temperature changes.

As a result, unless there is a leak, it is highly unlikely that Expression 1 will be satisfied, and even if Expression 1 is satisfied, it will only be temporary. If there is a leak, Expression 1 will not only be satisfied, but will continue to be satisfied.

Therefore, when the relationship of Expression 1 is not satisfied (i.e., NO in S106), the tank internal pressure Pfg is within a range that could not exist if there were a leak in the fuel tank 10, so it can be determined that there is no leak.

That is, when the determination in step S106 is no, the ECU 54 clears a counter Ca that will be described later (i.e., Ca=0) (S108). Then the ECU 54 closes the CCV 30 (S110) and then opens the stop valve 22a (S112). That is, the fuel tank 10 and the canister 18 become a combined space via the discharge passage 20 by the stop valve 22a being opened. The CCV 30 and the purge control valve 38 are closed, so the fuel tank 10 and the canister 18 become a combined space that is closed off so as to form a second closed system.

Then the ECU 54 turns on a second closed system leak execution flag (S114), and turns off the first closed system leak diagnostic execution flag (S116), and then exits the routine. By turning off the first closed system leak diagnostic execution flag (S116), the determination in step S100 will be NO in the next execution cycle of the first closed system leak diagnostic routine (FIG. 2), so the first closed system leak diagnostic routine (FIG. 2) effectively ends. By turning on the second closed system leak execution flag (S114), the ECU 54 starts the diagnostic process of the second closed system leak diagnostic routine (FIG. 3).

On the other hand, when the relationship of Expression 1 is satisfied at the beginning of the first closed system leak diagnostic routine (FIG. 2) (i.e., YES in S106), the ECU 54 then counts up the counter Ca (S118). The counter Ca is counted up (i.e., incremented) in order to determine whether the tank internal pressure Pfg is stable while satisfying Expression 1. The counter Ca is set to zero in the initial setting of the ECU 54.

The ECU 54 next determines whether the counter Ca exceeds a reference count value A (S120). The reference count value A is a threshold value for providing a waiting period for determining that the tank internal pressure Pfg is stable while satisfying Expression 1.

If the counter Ca is equal to or less than the reference count value A (i.e., (Ca≤A) (i.e., NO in S120), the ECU 54 suspends the leak determination (S122) and exits the first closed system leak diagnostic routine (FIG. 2). Thereafter, the ECU 54 continues to suspend the leak determination (S122) as long as the tank internal pressure Pfg continues to satisfy Expression 1 above (i.e., YES in S106) and the counter Ca that is counted up is equal to or less than the reference count value A (i.e., NO in S120). No step is actually executed with the suspension of the leak determination (S122).

That is, if, while the determination in step S106 is repeatedly YES and the determination in step S120 is repeatedly NO, the tank internal pressure Pfg changes so that Expression 1 is not satisfied (i.e., NO in S106), it is evident that Expression 1 is not satisfied stably, only temporarily.

Therefore, the ECU 54 first clears the counter Ca as described above (S108). Then the ECU 54 closes the CCV 30 (S110) and then opens the stop valve 22a (S112). The fuel tank 10 and the canister 18 become a combined space that is closed off, thus enabling the second closed system to be formed.

Then the ECU 54 turns on the first closed system leak execution flag (S114), and turns off the first closed system leak diagnostic execution flag (S116), and then exits the routine. As a result, the first closed system leak diagnostic routine (FIG. 2) effectively ends, and the diagnostic process of the second closed system leak diagnostic routine (FIG. 3) starts.

If, while the determination in step S106 is repeatedly YES and the determination in step S120 is repeatedly NO in the first closed system leak diagnostic routine (FIG. 2), the counter Ca exceeds the reference count value A (i.e., YES in S120), the ECU 54 outputs a diagnostic result indicating that there is a leak abnormality in the first closed system (S124).

That is, it is determined that there is a leak in the fuel tank 10 and the tank internal pressure Pfg stably satisfies Expression 1 (i.e., the tank internal pressure Pfg is stably within the region near atmospheric pressure that includes atmospheric pressure), so it is determined that there is a leak abnormality in the fuel tank 10.

Then the evaporation system 4 turns off the first closed system leak diagnostic execution flag (S116). As a result, the first closed system leak diagnostic routine (FIG. 2) effectively ends. In this example embodiment, the ECU 54 does not turn on the second closed system leak diagnostic execution flag (S114) when it is determined that there is a leak abnormality in the first closed system, so the diagnostic process of the second closed system leak diagnostic routine (FIG. 3) is not started.

Next, the second closed system leak diagnostic routine (FIG. 3) that executes an effective diagnostic process in response to the ECU 54 turning on the second closed system leak diagnostic execution flag (S114) in the first closed system leak diagnostic routine (FIG. 2) will be described.

In the second closed system leak diagnostic routine (FIG. 3), the ECU 54 first determines whether the second closed system leak diagnostic execution flag is turned on (S150). If the second closed system leak diagnostic execution flag is not turned on (i.e., NO in S150), the ECU 54 exits the routine. The diagnostic process in the second closed system leak diagnostic routine (FIG. 3) is not performed while the step described above is being repeated.

If the second closed system leak diagnostic execution flag has been turned on in step S114 of the first closed system leak diagnostic routine (FIG. 2) (i.e., YES in S150), the ECU 54 then determines whether a precondition Jb for performing a leak diagnostic is satisfied (S152). The precondition Jb is a precondition in which condition 3 below has been added as an AND condition to the precondition Ja described in step S102.

Condition 3. Condition 3 is that a predetermined period of time have passed after the stop valve 22a is opened. Condition 3 is provided for a waiting period until the pressure (negative pressure or positive pressure with respect to atmospheric pressure) inside the fuel tank 10 spreads inside the canister 18 and becomes uniform throughout the second closed system. Ten seconds, for example, is set as the predetermined period of time.

Even if the condition corresponding to the precondition Ja is satisfied, the precondition Jb will not be satisfied (i.e., NO in S152) unless the predetermined period of time has passed after the stop valve 22a has opened, so the ECU 54 exits the routine. Thereafter, until the predetermined period of time has passed, the ECU 54 makes a determination of NO in step S152, so the substantive steps are repeatedly not executed.

When the predetermined period of time passes and the precondition Jb is satisfied (i.e., YES in S152), the ECU 54 then reads the value of the tank internal pressure Pfg detected by the tank internal pressure sensor 42 to the work area provided in the memory of the ECU 54 (S154).

Then the ECU 54 determines whether the value of the tank internal pressure Pfg is within the region near atmospheric pressure indicated by Expression 1 (S156). This timing is after the precondition Jb is satisfied, so the predetermined period of time should have passed with the second closed system, i.e., the combined space of the fuel tank 10 and the canister 18, closed off, and the pressure inside the fuel tank 10 should have spread sufficiently and stabilized throughout the canister 18 that had been at atmospheric pressure until right before the start of the diagnostic process of the second closed system leak diagnostic routine (FIG. 3).

Moreover, the volume of the fuel tank 10 is sufficiently larger than the volume of the canister 18, so even if there is a large amount of fuel 10a inside the fuel tank 10, the spatial volume of the upper space 10b is sufficiently larger than the spatial volume inside the canister 18.

As a result, if inside of the fuel tank 10 in the first closed system state is a negative pressure (Pfg<$-\alpha$) corresponding to an area outside of the region near atmospheric pressure, then even if the second closed system with the additional volume of the canister 18 is formed, the internal pressure of the second closed system can also be made a sufficiently negative pressure. Also, if inside of the fuel tank 10 in the first closed system state is a positive pressure ($\beta$<Pfg) corresponding to an area outside of the region near atmospheric pressure, then even if the second closed system with the additional volume of the canister 18 is formed, the internal pressure of the second closed system can also be made a sufficiently positive pressure.

Moreover, the fuel 10a in the fuel tank 10 also works to maintain its vapor pressure according to the temperature, so negative pressure or positive pressure is sufficiently imparted to the entire second closed system. As a result, even if the fuel tank 10 shifts from the first closed system to the second closed system, the pressure of the upper space 10b of the fuel tank 10 is able to be kept outside of the region near atmospheric pressure.

However, if there is a leak in the second closed system that should be closed off, the differential pressure with respect to atmospheric pressure will be smaller than it is if there is no leak after a predetermined period of time, and the pressure inside of the fuel tank 10 will enter the region near atmospheric pressure.

Therefore, in step S156, the ECU 54 determines whether the tank internal pressure Pfg is in a region such as that indicated by Expression 1, and determines the likelihood that there is a leak in the second closed system according to the determination result.

The determination in step S156 is a determination that is made when it has been determined that there is not a leak in the fuel tank 10 that formed the first closed system in the first closed system leak diagnostic routine (FIG. 2) described above. Accordingly, the leak diagnostic with respect to the second closed system is actually a leak diagnostic for the canister 18.

Here, if Expression 1 above is not satisfied (i.e., NO in step S156), the tank internal pressure Pfg is within a range that could not exist if there were a leak in the canister 18. In other words, there is no leak abnormality in the canister 18.

When there is no abnormality, there is no leak in either the fuel tank 10 or the canister 18, so the ECU 54 outputs a diagnostic result indicating that the entire evaporation system 4 is normal (S158). Then the ECU 54 clears a counter Cb that will be described later (i.e., Cb=0) (S160). The ECU 54 then turns off the second closed system leak diagnostic execution flag (S162) and exits the routine. By turning off the second closed system leak diagnostic execution flag (S162), the ECU

54 also executes a process to return the CCV 30 and the stop valve 22a to their original positions. That is, the ECU 54 first closes the stop valve 22a to return the fuel tank 10 to the closed off state, and then opens the CCV 30.

Then when the internal combustion engine 2 starts to operate, the opening amount of the purge control valve 38 and the open/closed states of the CCV 30 and the stop valve 22a are controlled by purge control that is performed separately. Also, when the internal combustion engine 2 remains stopped, the stop valve 22a is kept closed and the CCV 30 is kept open until the leak diagnostic is next performed.

When it is determined that the evaporation system is normal (S158) as a result of there being no leak abnormality in either the fuel tank 10 or the canister 18, the leak diagnostic of the second closed system leak diagnostic routine (FIG. 3) is stopped.

On the other hand, if the relationship in Expression 1 above is satisfied at the beginning of the second closed system leak diagnostic routine (FIG. 3) (i.e., YES in S156), the ECU 54 then counts up the counter Cb (S164). The counter Cb is counted up (i.e., incremented) in order to determine that the tank internal pressure Pfg is stable at a value that satisfies Expression 1. The counter Cb is set to zero in the initial setting of the ECU 54.

Next, the ECU 54 determines whether the counter Cb exceeds a reference count value B (S166). The reference count value B is a threshold value for providing a waiting period for determining that the tank internal pressure Pfg is stable while satisfying Expression 1. The reference count value B may be the same value as the reference count value A used in step S120, or a different value.

For example, the tank internal pressure Pfg just before the switch from the first closed system to the second closed system may be a value that is outside of the region near atmospheric pressure but extremely close to the region near atmospheric pressure. In this case, when the switch is made from the first closed system to the second closed system, even if the volume of the upper space 10b of the fuel tank 10 is sufficiently larger than the spatial volume of the canister 18, the tank internal pressure Pfg may temporarily be in the region near atmospheric pressure, such that Expression 1 is satisfied.

If there is no leak in the canister 18, after a while the vapor pressure will come to correspond to the temperature due to condensation and the production of fuel vapor on the fuel tank 10 side, and the tank internal pressure Pfg will shift outside of the region near atmospheric pressure and stabilize. However, if there is a leak in the canister 18, then even after a while the tank internal pressure Pfg will remain near atmospheric pressure and stabilize within the region near atmospheric pressure. The waiting period is executed in step S166 in order to allow the tank internal pressure Pfg to stabilize.

If the counter Cb is equal to or less than the reference count value B (i.e., (Cb≤B) (i.e., NO in S166), the ECU 54 suspends the leak determination (S168) and exits the second closed system leak diagnostic routine (FIG. 3). Thereafter, the ECU 54 continues to suspend the leak determination (S168) as long as the tank internal pressure Pfg continues to satisfy Expression 1 above (i.e., YES in S156) and the counter Cb that is counted up is equal to or less than the reference count value B (i.e., NO in S166). No step is actually executed with the suspension of the leak determination (S168).

That is, if, while the determination in step S156 is repeatedly YES and the determination in step S166 is repeatedly NO, the tank internal pressure Pfg changes so that Expression 1 is not satisfied (i.e., NO in S156), the ECU 54 outputs a diagnostic result indicating that the evaporation system is normal as described above (S158) and clears the counter Cb (S160). Then the ECU 54 turns off the second closed system leak diagnostic execution flag (S162), and exits the routine. With this step, the leak diagnostic of the second closed system leak diagnostic routine (FIG. 3) ends.

If, while the determination in step S156 is repeatedly YES and the determination in step S166 is repeatedly NO in the second closed system leak diagnostic routine (FIG. 3), the counter Cb exceeds the reference counter value B (i.e., YES in S166), the ECU 54 outputs a diagnostic result indicating that there is a leak abnormality in the second closed system (S170).

That is, the determination that there is a leak abnormality in the second closed system here is made when there is a leak in the canister 18 and the tank internal pressure Pfg is stable in the region near atmospheric pressure. Therefore, it will essentially be determined in step S170 that there is a leak abnormality in the canister 18. Accordingly, in step S170, the ECU 54 may directly output a diagnostic result indicating that there is a leak abnormality in the canister 18.

Figure 4:
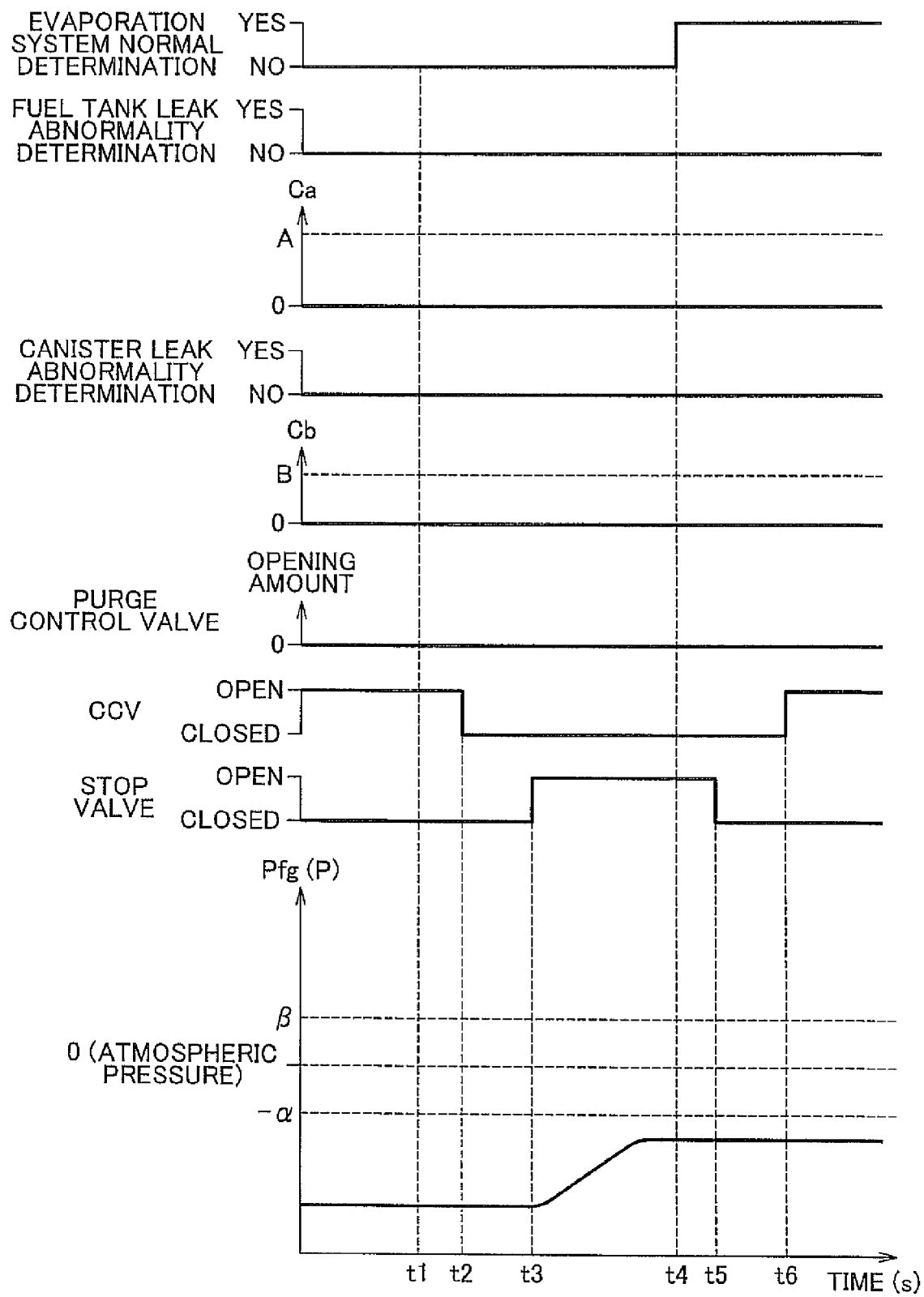
FIG. 4 is a timing chart showing one example of the routines of the first example embodiment.

Then after step S170, the ECU 54 turns off the second closed system leak diagnostic execution flag (S162). With this step, the diagnostic process of the second closed system leak diagnostic routine (FIG. 3) ends. FIGS. 4 to 8 show one example of the control in this example embodiment. In FIG. 4, at timing t1 when the internal combustion engine 2 is stopped, the precondition Ja is satisfied and the leak diagnostic of the first closed system leak diagnostic routine (FIG. 2) is executed. At this time, the tank internal pressure Pfg is less than −α (i.e., Pfg<−α) (i.e., NO in S106), so the ECU 54 clears the counter Ca (S108). However, the counter Ca has not yet been counted up, so Ca=0 is maintained.

Then the ECU 54 closes the CCV 30 (S110) at timing t2 and opens the stop valve 22a at timing t3 (S112), thereby forming the second closed system. Also, the ECU 54 starts the second closed system leak diagnostic routine (FIG. 3) in response to the second closed system leak diagnostic execution flag being turned ON (S114), and the precondition Jb becomes satisfied at timing t4 (i.e., YES in S152) as a result of the predetermined period of time described above passing. At timing t4, the tank internal pressure Pfg is outside of the region indicated by Expression 1 (i.e., NO in S156). From this step, the ECU 54 outputs a diagnostic result indicating that the evaporation system 4 is normal (S158), and then clears the counter Cb (S160). However, the counter Cb has not yet been counted up, so Cb=0) is maintained.

Then the ECU 54 turns off the second closed system leak diagnostic execution flag (S162), such that the leak diagnostic ends. In step S162, the ECU 54 closes the stop valve 22a as described above at timing t5 and then opens the CCV 30 at timing t6, as the steps when the leak diagnostic ends.

Figure 5:
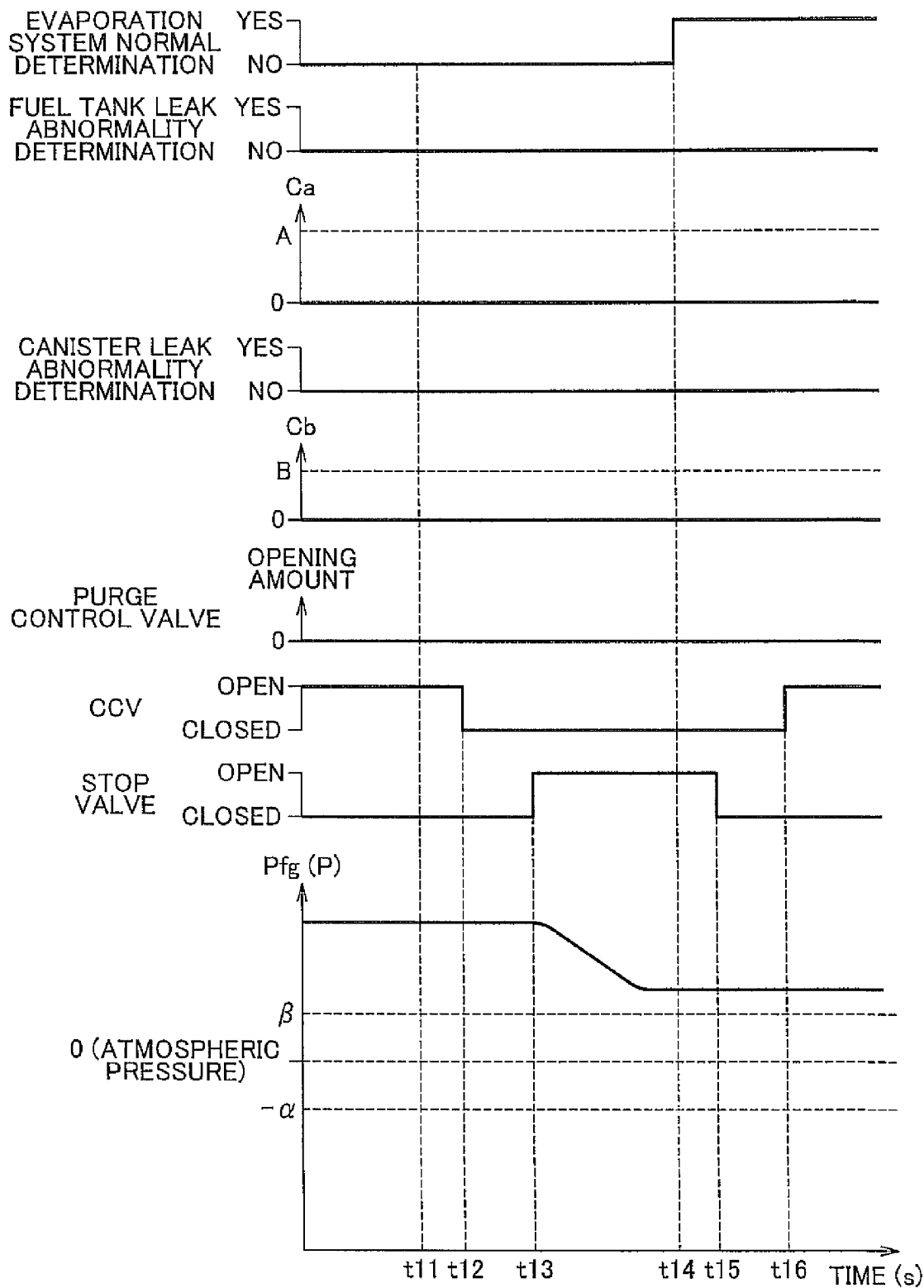
FIG. 5 is a timing chart showing one example of the routines of the first example embodiment.

The example shown in FIG. 4 is an example in which the tank internal pressure Pfg is below atmospheric pressure and there is sufficient differential pressure with respect to atmospheric pressure. A case in which the tank internal pressure Pfg is above atmospheric pressure and there is sufficient differential pressure with respect to atmospheric pressure, as shown in FIG. 5, is similar. That is, as shown by timings t11 to t16 in FIG. 5, the routine is executed with the same flow as that shown in FIG. 4, and ultimately in step S158, the ECU 54 outputs a diagnostic result indicating that the evaporation system is normal.

Figure 6:
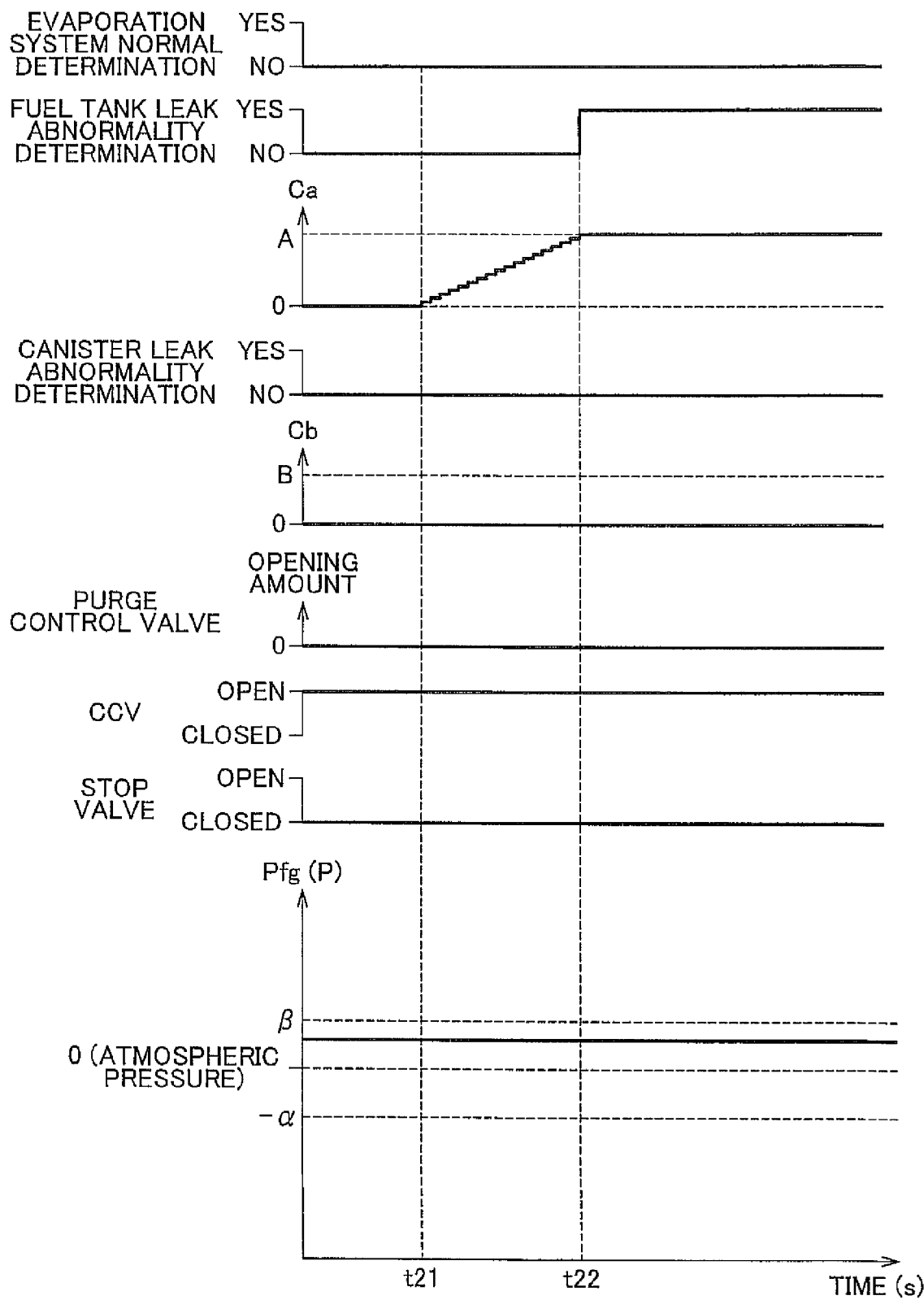
FIG. 6 is a timing chart showing one example of the routines of the first example embodiment.

FIG. 6 is a view of an example in which there is a leak abnormality in the fuel tank 10. Therefore, in the first closed system leak diagnostic routine (FIG. 2), the ECU 54 performs a leak diagnostic while the tank internal pressure Pfg is stably in the region near atmospheric pressure (i.e., −α≤Pfg≤β). The precondition Ja is satisfied at timing t21 when the internal combustion engine is stopped, so the ECU 54 executes the leak diagnostic. At this time, $-\alpha \le$ tank internal pressure Pfg$\le \beta$ (i.e., YES in S106), so the ECU 54 starts to count up the counter Ca (S118). Thereafter as well, the state of $-\alpha \le$ tank internal pressure Pfg$\le \beta$ is maintained, so the counter Ca exceeds the reference count value A at timing t22 (i.e., YES in S120). Accordingly, the ECU 54 outputs a diagnostic result indicating that there is a leak abnormality in the first closed system (S124). That is, the ECU 54 determines that there is a leak in the fuel tank 10.

Then the ECU 54 turns off the first closed system leak diagnostic execution flag (S116), and thus no longer performs the leak diagnostic of the first closed system leak diagnostic routine (FIG. 2), nor performs a leak diagnostic of the second closed system leak diagnostic routine (FIG. 3).

Figure 7:
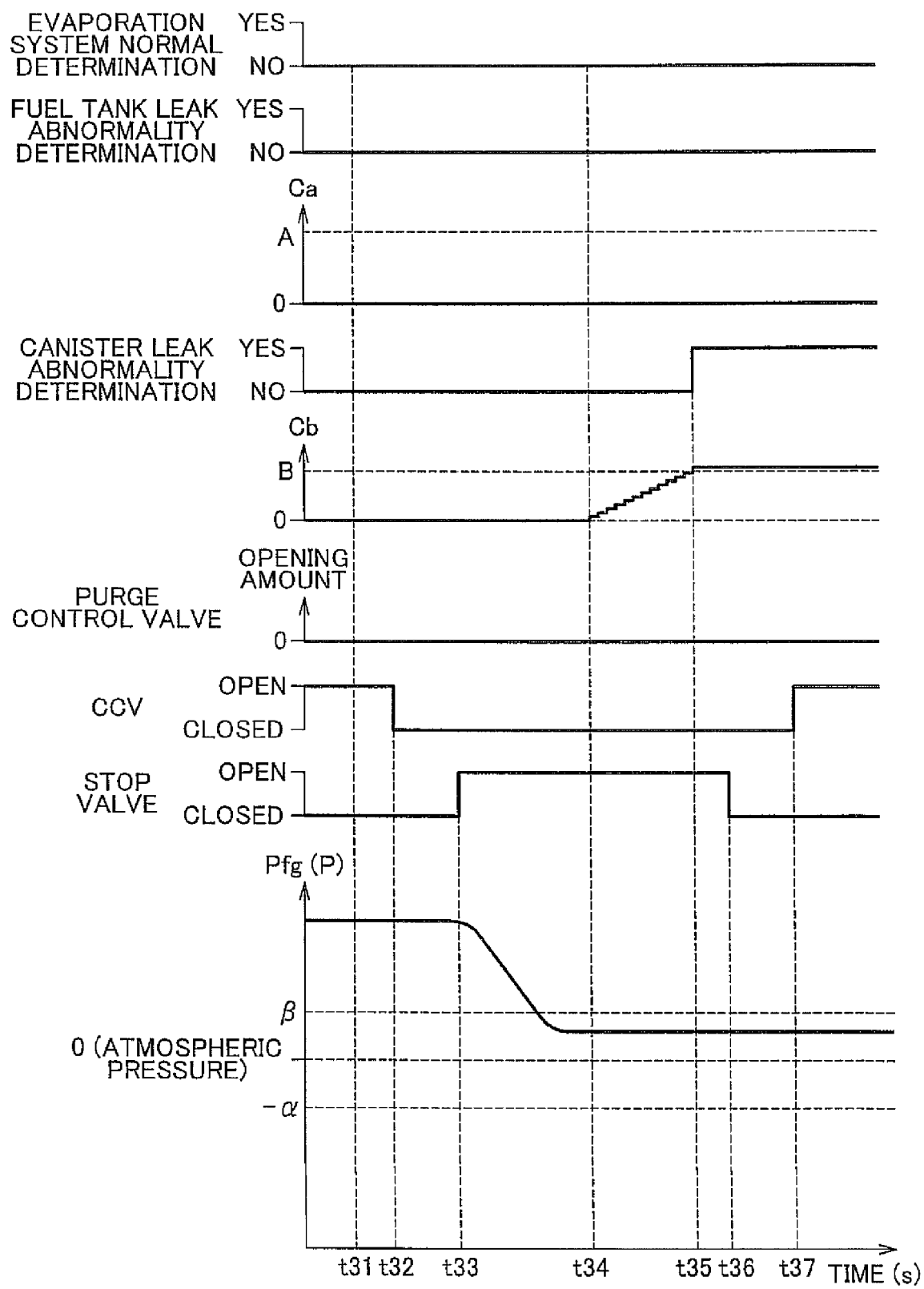
FIG. 7 is a timing chart showing one example of the routines of the first example embodiment.

FIG. 7 is a view of an example in which there is no leak abnormality in the fuel tank 10 but there is a leak abnormality in the canister 18. In the first closed system leak diagnostic routine (FIG. 2), the precondition Ja is satisfied at timing t31 when the internal combustion engine is stopped, so the ECU 54 performs a leak diagnostic. At this time, the tank internal pressure Pfg is greater than $\beta$ (i.e., Pfg$>\beta$) (i.e., NO in S106), so the ECU 54 clears the counter Ca (S108).

Then the ECU 54 closes the CCV 30 at timing t32 (S110) and opens the stop valve 22a at timing t33 (S112), thereby forming the second closed system. Then the ECU 54 starts the second closed system leak diagnostic routine (FIG. 3) in response to the second closed system leak diagnostic execution flag being turned ON (S114), and the precondition Jb becomes satisfied at timing t34 (i.e., YES in S152) as a result of the predetermined period of time described above passing. At timing t34, the tank internal pressure Pfg drops within the region near atmospheric pressure (i.e., YES in S156) because there is a leak in the canister 18.

Therefore, the ECU 54 starts to count up the counter Cb (S164). Thereafter as well, the state of $-\alpha \le$ tank internal pressure Pfg$\le \beta$ is maintained, so the counter Cb exceeds the reference count value B at timing t35 (i.e., YES in S166). From this step, the ECU 54 outputs a diagnostic result indicating that there is a leak abnormality in the second closed system (i.e., a leak abnormality in the canister) (S170). The determination that there is a leak abnormality in second closed system indicates that there is a leak abnormality in the canister 18, not the fuel tank 10. That is, the ECU 54 is able to distinguish a leak abnormality in the canister 18 from a leak abnormality in the fuel tank 10.

Figure 8:
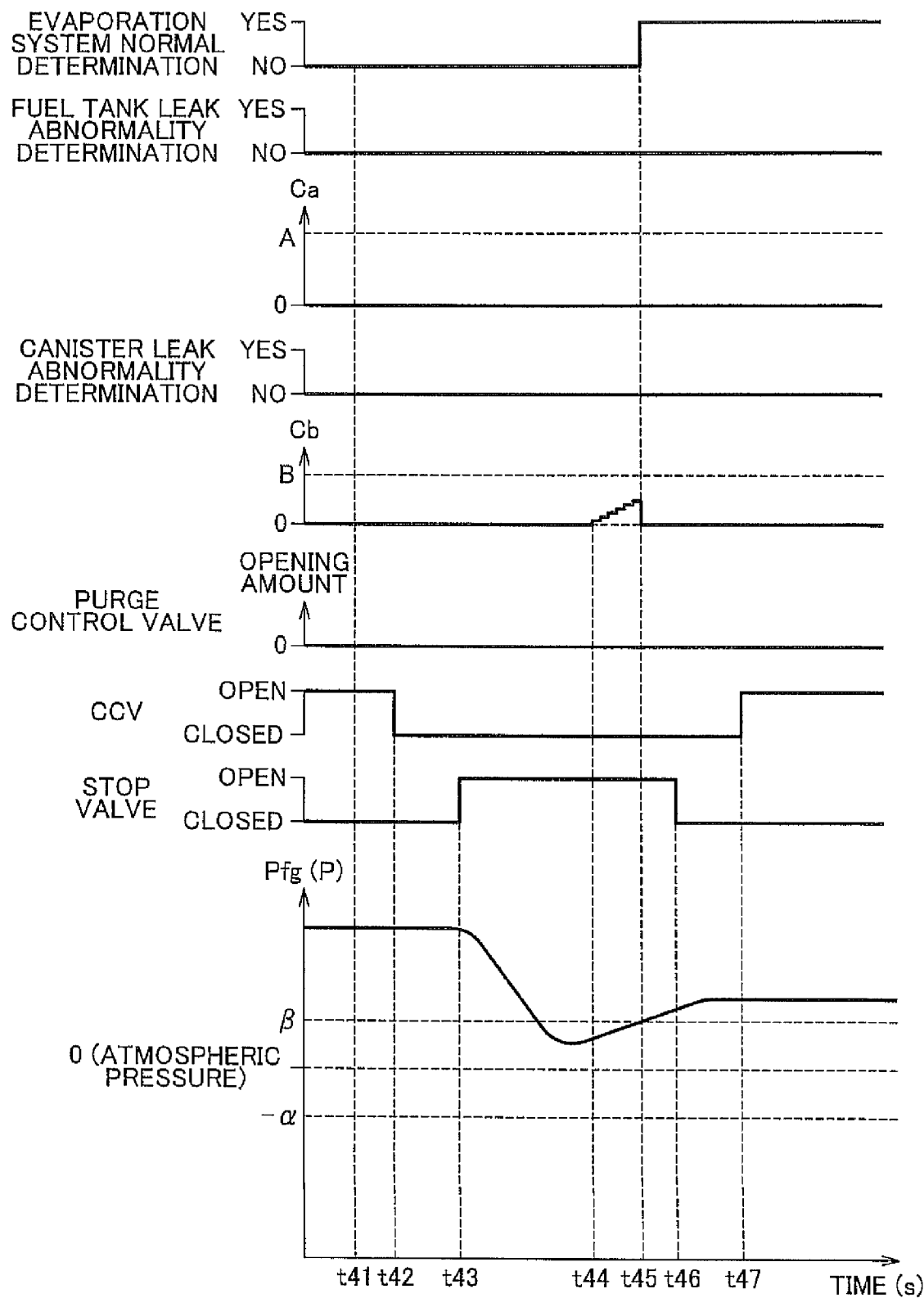
FIG. 8 is a timing chart showing one example of the routines of the first example embodiment.

Then, the ECU 54 turns off the second closed system leak diagnostic execution flag (S162). Accordingly, the ECU 54 closes the stop valve 22a at timing t36 and opens the CCV 30 at timing t37. FIG. 8 is a timing chart showing an example of a case in which there is no leak abnormality in either the fuel tank 10 or the canister 18. The precondition Ja is satisfied at timing t41 when the internal combustion engine is stopped, so the ECU 54 executes a leak diagnostic process according to the first closed system leak diagnostic routine (FIG. 2). At this time, the tank internal pressure Pfg is greater than $\beta$ (i.e., Pfg$>\beta$) (i.e., NO in S106), so the ECU 54 clears the counter Ca (S108).

Then the ECU 54 closes the CCV 30 (S110) at timing t42 and opens the stop valve 22a at timing t43 (S112), thereby forming the second closed system. Then, the ECU 54 starts the second closed system leak diagnostic routine (FIG. 3) in response to the second closed system leak diagnostic execution flag being turned ON (S114), and the precondition Jb becomes satisfied at timing t44 (i.e., YES in S152) as a result of the predetermined period of time described above passing.

At timing t44, there is no leak in the canister 18. However, if the pressure inside the canister 18 drops due to the vehicle environment or some other reason, the tank internal pressure Pfg will temporarily fall to within the region near atmospheric pressure (i.e., YES in S156).

Therefore, the ECU 54 starts to count up the counter Cb (S164). Then in the second closed system, the fuel vapor pressure from the fuel 10a in the fuel tank 10 rises to correspond to the temperature, and the tank internal pressure Pfg returns to outside of the region near atmospheric pressure.

Then, during the period of time when the counter Cb is equal to or less than the count value B (i.e., Cb$\le$B), the tank internal pressure Pfg becomes greater than $\beta$ (i.e., Pfg$>\beta$), so Expression 1 is no longer satisfied. Therefore, the determination in step S156 at timing t45 is NO. Accordingly, the ECU 54 determines that the evaporation system is normal (S158), clears the counter Cb (S160), and turns off the second closed system leak diagnostic execution flag (S162).

Therefore, the ECU 54 closes the stop valve 22a at timing t46, and opens the CCV 30 at timing t47. The example in FIGS. 6 to 8 is an example in which the tank internal pressure Pfg is on the positive pressure side, i.e., the high pressure side, of atmospheric pressure. However, the ECU 54 is also able to make a determination distinguishing a leak abnormality in the fuel tank 10 from a leak abnormality in the canister 18 when the tank internal pressure Pfg is on the negative pressure side, i.e., the low pressure side, of atmospheric pressure.

The tank internal pressure sensor 42 may correspond to the tank internal pressure detecting device of the invention, the stop valve 22a may correspond to the first closed system forming device of the invention, and the CCV 30 and the purge control valve 38 may correspond to the second closed system forming device of the invention.

The ECU 54 may correspond to the first closed system leak diagnostic unit and the second closed system leak diagnostic unit of the invention. Steps S100 to S108 and S118 to S124 of the first closed system leak diagnostic routine (FIG. 2) executed by the ECU 54 may correspond to processes of the first closed system leak diagnostic unit of the invention. Steps S110 to S114 of the first closed system leak diagnostic routine (FIG. 2) and steps S150 to S156, S160, and S164 to S170 of the second closed system leak diagnostic routine (FIG. 3) may correspond to the processes of the second closed system leak diagnostic unit of the invention.

(Effects)

In the closed-off fuel tank 10, even if positive pressure or negative pressure is introduced from the outside, the tank internal pressure Pfg will largely fluctuate with respect to atmospheric pressure due to the temperature changing as a result of heat being transferred to and from the outside. This fluctuation presupposes that there is no leak abnormality in the fuel tank 10.

In the first closed system leak diagnostic routine (FIG. 2), using the phenomenon described above, the state of the tank internal pressure Pfg is determined when the first closed system is formed by closing off the fuel tank 10 using the stop valve 22a, and the precondition Ja described above is satisfied.

That is, it is determined that there is a leak in the first closed system when there is not sufficient differential pressure between the tank internal pressure Pfg and atmospheric pressure. That is, the determination as to whether there is a leak in the fuel tank 10 can be accurately made based on the tank internal pressure Pfg according to the first closed system leak diagnostic routine (FIG. 2).

When there is no leak abnormality in the fuel tank 10, i.e., when there is sufficient differential pressure between the inside of the fuel tank 10 and atmospheric pressure, the differential pressure (i.e., the negative pressure or the positive pressure) inside of the fuel tank 10 is introduced into the canister 18 by forming the second closed system.

Here, the fuel tank 10 has a sufficiently larger spatial capacity than the canister 18, so when the switch is made from the first closed system to the second closed system, the pressure (i.e., positive pressure or negative pressure) introduced into the canister 18 is created by gas flowing from the larger capacity space into the smaller capacity space. Moreover, the fuel 10a inside of the fuel tank 10 tries to keep the vapor pressure at a pressure corresponding to the temperature.

Even if the spatial capacity increases from the first closed system to the second closed system, there will not be a large pressure change with the overall second closed system. That is, even if the canister 18 is at atmospheric pressure until right before, it will not greatly affect the pressure on the fuel tank 10 side that is the large capacity space. Therefore, even if the internal spaces of the fuel tank 10 and the canister 18 are combined to form the second closed system, the differential pressure with respect to the atmospheric pressure side is able to be sufficiently ensured.

If sufficient differential pressure is maintained between the tank internal pressure Pfg and atmospheric pressure, it is determined that there is no leak in the second closed system, as the result of the diagnostic of the second closed system leak diagnostic routine (FIG. 3) executed after the switch from the first closed system to the second closed system.

If sufficient differential pressure is not maintained between the tank internal pressure Pfg and atmospheric pressure, it is determined that there is a leak in the second closed system. In this case, it has already been determined that there is no leak in the fuel tank 10, so it is evident that the leak is in the canister 18.

Therefore, in the second closed system leak diagnostic routine (FIG. 3), the leak diagnostic of the second closed system can also be reliably executed based on the tank internal pressure Pfg, and moreover, the leak diagnostic for the second closed system is able to be accurately executed as a leak diagnostic for only the canister 18.

Accordingly, it is possible to perform a leak diagnostic distinguishing between the canister 18 and the fuel tank 10 even when the internal combustion engine is stopped, using a single pressure sensor (i.e., the tank internal pressure sensor 42), without adding a pressure increase/decrease mechanism such as a pump or a pressure switching mechanism such as a three-way valve to the evaporation system 4.

[Second Example Embodiment]
(Structure)

This second example embodiment employs the structure shown in FIG. 1 that is described in the foregoing first example embodiment. Here, the ECU 54 executes the second closed system leak diagnostic routine shown in FIG. 9 instead of the second closed system leak diagnostic routine (FIG. 3) described in the first example embodiment. The first closed system leak diagnostic routine (FIG. 2) is executed just as it is in the first example embodiment. Therefore, the second example embodiment will be described with reference to FIGS. 1, 2, and 9.

Figure 9:
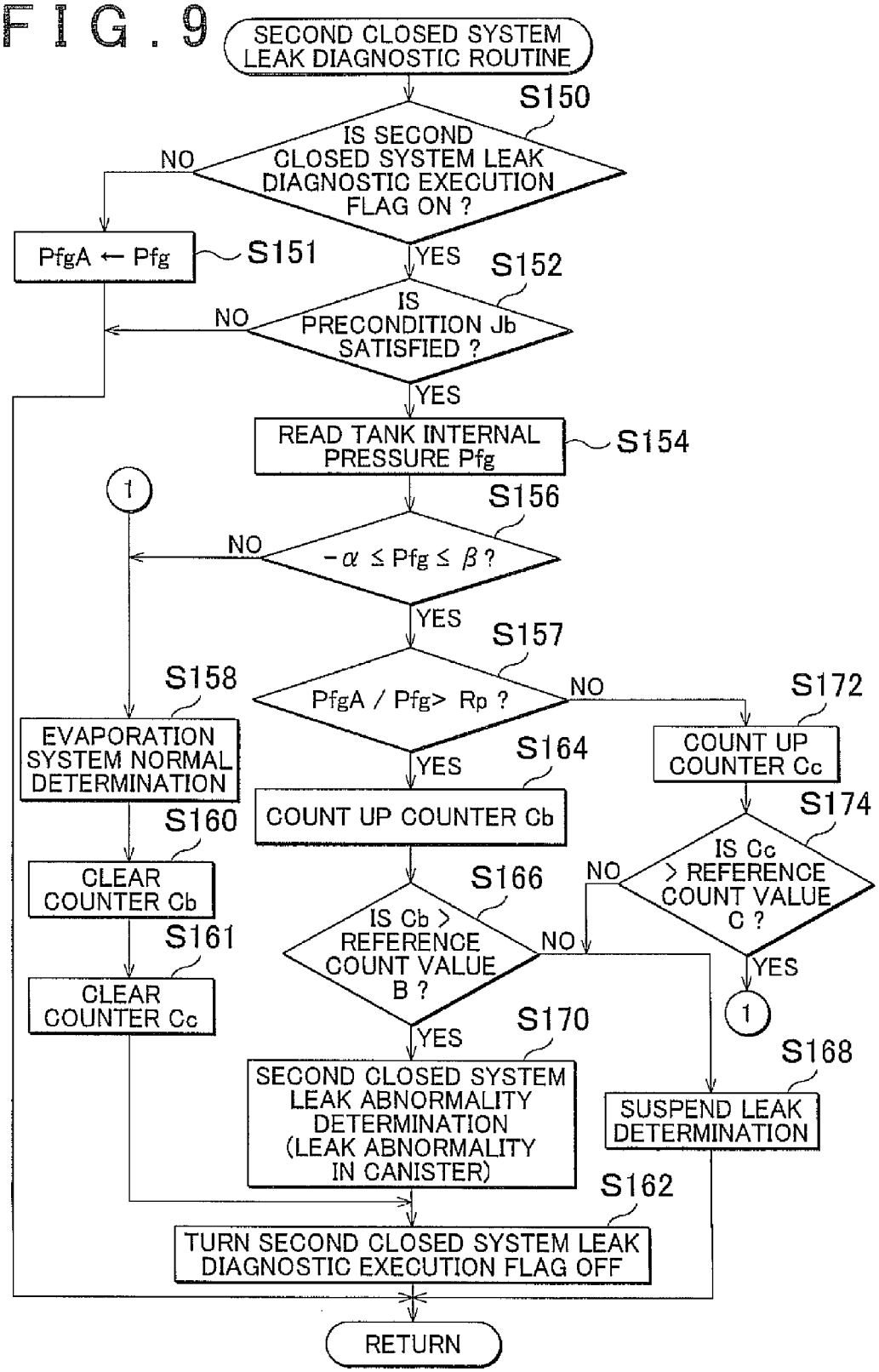
FIG. 9 is a flowchart illustrating a second closed system leak diagnostic routine according to a second example embodiment of the invention.

The second closed system leak diagnostic routine (FIG. 9) is a routine in which steps S151, S157, S161, S172, and S174 have been added to the second closed system leak diagnostic routine (FIG. 3). In FIG. 9, the steps that are the same as those in the second closed system leak diagnostic routine (FIG. 3) are denoted by the same step numbers.

(Operation) The operation of this example embodiment based on the structure described above will be described together with the routine executed by the ECU 54.

In the second closed system leak diagnostic routine (FIG. 9), if the second closed system leak diagnostic execution flag has not been turned on, the ECU 54 makes a determination of NO in step S150 and stores the current tank internal pressure Pfg in memory as a holding tank internal pressure value PfgA (S151). When step S104 in the first closed system leak diagnostic routine (FIG. 2) is executed, the current tank internal pressure Pfg uses a value read from the tank internal pressure sensor 42 at the time of that execution.

When the second closed system leak diagnostic execution flag has not been turned on (i.e., NO in 150), the latest tank internal pressure Pfg is maintained at the holding tank internal pressure value PfgA by executing step S151.

As described in example embodiment 1, if Expression 1 becomes no longer satisfied in the first closed system leak diagnostic routine (FIG. 2) (i.e., NO in S106), the ECU 54 turns on the second closed system leak diagnostic execution flag (S114) after executing steps S108 to S112. Then the ECU 54 makes a determination of YES in step S150 of the second closed system leak diagnostic routine (FIG. 9), and starts the substantive steps of the second closed system leak diagnostic routine (FIG. 9).

First, the ECU 54 determines whether the precondition Jb for performing the leak diagnostic is satisfied (S152). The precondition Jb is the same as the precondition Ja with the addition of a predetermined time elapsed requirement added as an AND condition (as described in the first example embodiment).

Even if a condition corresponding to the precondition Ja is satisfied at the determination timing of the precondition Jb, the precondition Jb will not be satisfied (i.e., NO in S152) unless the predetermined period of time has passed after the stop valve 22a has been opened, so the ECU 54 exits the routine.

Thereafter, until the predetermined period of time passes, the ECU 54 repeatedly makes a determination of NO in step S152 such that a substantive leak diagnostic continues to not be performed. Then when the predetermined period of time passes and the precondition Jb is satisfied (i.e., YES in S152), the ECU 54 reads the value of the tank internal pressure Pfg detected by the tank internal pressure sensor 42 to a work area provided in the memory of the ECU 54 (S154).

Then the ECU 54 determines whether the value of the tank internal pressure Pfg is in a region such as that indicated by Expression 1 (S156). At this timing, the precondition Jb has already been satisfied, so the predetermined period of time passes with the second closed system, i.e., the combined space of the fuel tank 10 and the canister 18, being closed.

Therefore, even if the pressure inside of the fuel tank 10 in the first closed system state is negative or positive, this pressure sufficiently spreads and is stable throughout the inside of the canister 18 that had been at atmospheric pressure until just before.

As described in the first example embodiment, if there is no leak in the canister 18, the tank internal pressure Pfg should be outside of the region near atmospheric pressure even after the switch to the second closed system regardless of whether the pressure inside of the fuel tank 10 in the first closed system state is negative or positive.

Therefore, next the ECU 54 determines whether the tank internal pressure Pfg is in the region near atmospheric pressure indicated by Expression 1 (S156). Accordingly, the ECU 54 determines the possibility that there is a leak in the second closed system. As described in the first example embodiment above, this timing is after it has already been determined that there is not a leak in the first closed system. Therefore, the leak diagnostic with respect to the second closed system is actually a leak diagnostic with respect to the canister 18.

Here, if Expression 1 is not satisfied (i.e., NO in S156), the tank internal pressure Pfg is in a range that could not exist if there were a leak in the canister 18. That is, there is not a leak in the canister 18. Therefore, the ECU 54 outputs a diagnostic result indicating that the entire evaporation system 4 is normal (S158). Then the ECU 54 clears the counter Cb (S160), and clears a counter Cc that will be described later (S161). Next, the ECU 54 turns off the second closed system leak diagnostic execution flag (S162) and exits the routine.

On the other hand, if Expression 1 is satisfied (i.e., YES in S156), the ECU 54 then determines whether a relationship such as that shown in Expression 2 is satisfied (S157).

$$PfgA/Pfg > Rp \qquad \text{[Expression 2]}$$

Expression 2 is an expression for determining a change in the tank internal pressure Pfg before and after the formation of the second closed system by comparing the holding tank internal pressure value PfgA with the current tank internal pressure Pfg.

More specifically, Expression 2 shows a state in which the ratio of the holding tank internal pressure value PfgA to the current tank internal pressure Pfg (i.e., PfgA/Pfg) is greater than a pressure change determining threshold value Rp. Even if Expression 1 is satisfied in step S156, there may not be a leak in the canister 18. That is, there may be a difference between the boundary value (i.e., −α or β) being used as the reference for the determination in Expression 1 and the actual value, due to various machine differences in the structures of the evaporation system 4 and the tank internal pressure sensor 42.

If there is a difference, even if there is not a leak in the canister 18, when a switch is made from the first closed system to the second closed system, the value of the tank internal pressure Pfg detected by the tank internal pressure sensor 42 may end up stabilizing at a pressure that satisfies the relationship of Expression 1.

Therefore, in step S157, the ECU 54 compares the tank internal pressure value PfgA that existed in the first closed state with the current tank internal pressure Pfg in order to further improve the leak detection accuracy by the satisfied/unsatisfied determination of Expression 1 that uses only the current tank internal pressure Pfg. That is, the change in the tank internal pressure Pfg at the time of the switch from the first closed system to the second closed system is determined by the pressure change determining threshold value Rp such as that in Expression 2, so a decrease in the leak detection accuracy due to the machine differences described above is prevented.

When the pressure in the first closed system is introduced into the second closed system, the spatial volume of the first closed system increases to the spatial volume of the second closed system. That is, the spatial volume of the canister 18 is added to the volume of the upper space 10b of the fuel tank 10.

If there is no leak in the second closed system and, when a switch is made from the first closed system to the second closed system, the volume of the upper space 10b of the fuel tank 10 is designated V1 and the spatial volume inside the canister 18 is designated V2, the relationship of Expression 3 below is satisfied based on the equation of state of gas.

$$PfgA \times V1 = Pfg \times (V1+V2) \qquad \text{[Expression 3]}$$

When Expression 3 is transformed, the relationship of Expression 4 is obtained.

$$PfgA/Pfg = (V1+V2)/V1 \qquad \text{[Expression 4]}$$

From the relationship of Expression 4, if there is a leak in the second closed system, the tank internal pressure Pfg approaches atmospheric pressure and the absolute value of the tank internal pressure Pfg differential pressure becomes smaller. Therefore, if there is a leak in the second closed system, the left side [PfgA/Pfg] of Expression 4 will become larger than the right side [(V1+V2)/V1].

Thus, if Expression 2 is satisfied when the pressure change determining threshold value Rp is set equal to (V1+V2)/V1 (i.e., Rp=(V1+V2)/V1), it can be determined that there is a leak in the second closed system, and if Expression 2 is not satisfied when the pressure change determining threshold value Rp is set equal to (V1+V2)/V1 (i.e., Rp=(V1+V2)/V1), it can be determined that there is not a leak in the second closed system. That is, the condition of Expression 2 is added as an AND operation to the condition of Expression 1 described above, and if both Expression 1 and Expression 2 are satisfied, the accuracy of a determination that there is a leak is able to be improved.

As the actual numerical value of the pressure change determining threshold value Rp, (V1+V2)/V1 is calculated beforehand with the upper space 10b of the fuel tank 10 as the smallest volume, for example, and the result is set as the pressure change determining threshold value Rp.

Alternatively, instead of having the upper space 10b of the fuel tank 10 be the smallest volume, the pressure change determining threshold value Rp may be calculated each time the second closed system leak diagnostic is executed. That is, the volume V1 of the upper space 10b of the fuel tank 10 is obtained based on a fuel level SGL inside the fuel tank 10 detected by the fuel sender gauge 14 each time the second closed system leak diagnostic is executed. Then (V1+V2)/V1 is calculated and the result may be set as the pressure change determining threshold value Rp.

Also, the gas in the space inside the canister 18 and the upper space 10b of the fuel tank 10 is not ideal gas, but rather a mixture of air and vapor fuel. Therefore, a correction suited to the actual property of the gas may be applied to the pressure change determining threshold value Rp as well, or an appropriate range may be set through testing.

If it is determined in step S157 that Expression 2 is not satisfied (i.e., NO in S157), the ECU 54 counts up (i.e., increments) the counter Cc (S172). The counter Cc is set to 0 in the initial setting of the ECU 54.

Next, the ECU 54 determines whether the counter Cc exceeds a reference count value C (S174). The reference count value C is a threshold value for setting the waiting period for determining whether the tank internal pressure Pfg is stable at a pressure that does not satisfy Expression 2.

If the counter Cc is equal to or less than the reference count value C (i.e., Cc≤C) (i.e., NO in S174), the ECU 54 suspends the leak determination (S168) and exits the second closed system leak diagnostic routine (FIG. 9). Thereafter, the ECU 54 continues to suspend the leak determination (S168) as long as Expression 1 is satisfied (i.e., YES in S156), Expression 2 is not satisfied (i.e., NO in S157), and the counter Cc that is counted up is equal to or less than the reference count value C (i.e., NO in S174).

When Expression 2 is not satisfied and the counter Cc is greater than the reference count value C (i.e., Cc>C) (i.e., YES in S174), the ECU 54 outputs a diagnostic result indicating that the evaporation system is normal (S158), clears the counter Cb (S160), and clears the counter Cc (S161). Then the ECU 54 turns off the second closed system leak diagnostic execution flag (S162) and exits the routine.

As a result of this step, the leak diagnostic of the second closed system leak diagnostic routine (FIG. 9) ends. That is, the ECU 54 makes a determination of NO in step S150 and again starts to update the holding tank internal pressure value PfgA (S151).

If Expression 2 is satisfied (i.e., YES in S157) while the counter Cc is equal to or less than the reference count value C (i.e., Cc≤C) (i.e., NO in S174), then the ECU 54 counts up the counter Cb (S164). The steps thereafter are just as described with reference to FIG. 3 in the first example embodiment above.

Regarding the counter Cb that is counted up in step S164, the count of the counter Cb may also start to be counted from the value of the counter Cc when there is a count value that exceeds zero for the counter Cc at the point when the determination in step S157 is YES. Alternatively, instead of the counter Cc used in steps S172 and S174, the counter Cb common to steps S164 and S166 may be used.

Figure 10:
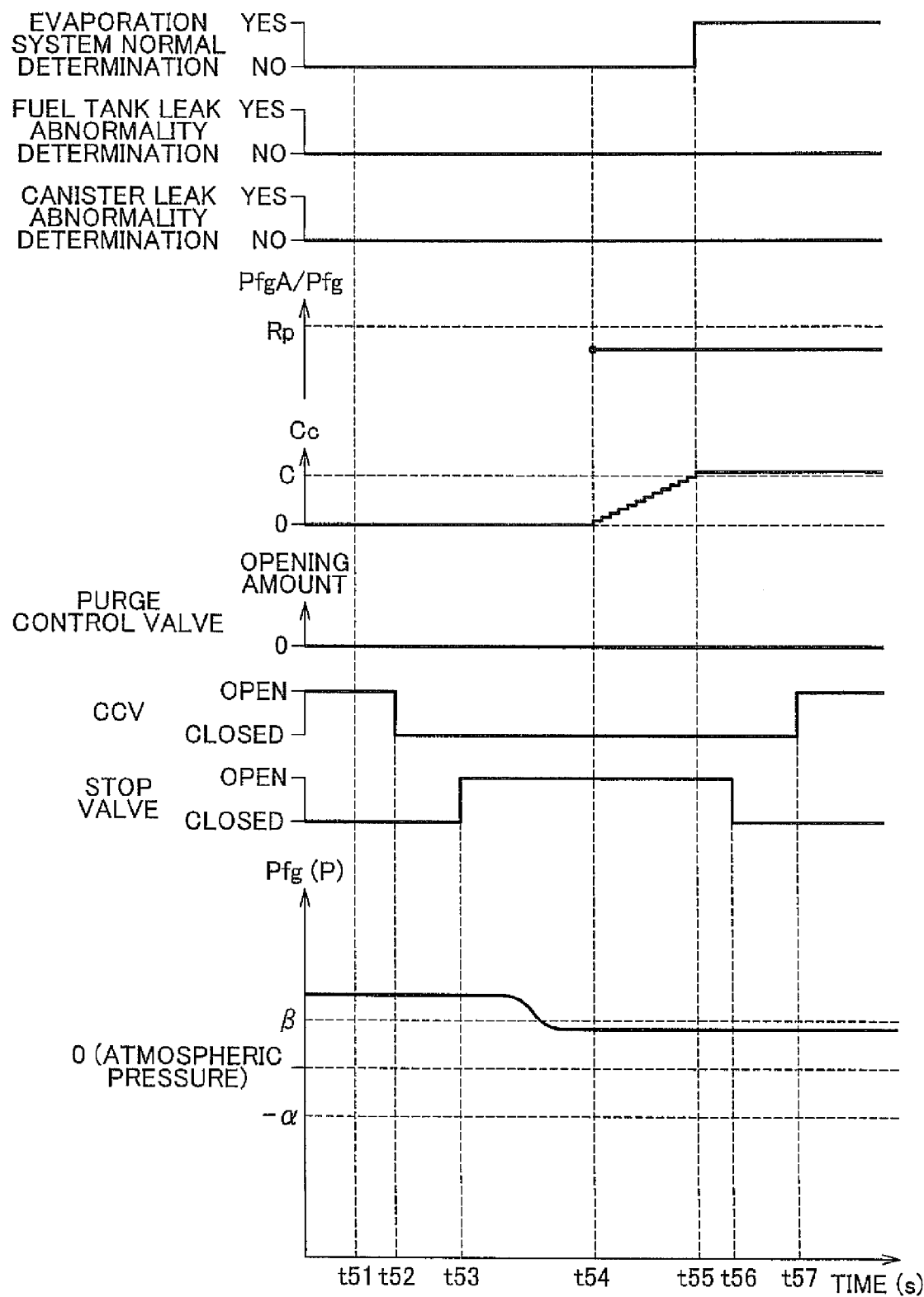
FIG. 10 is a timing chart showing one example of the routine of the second example embodiment.

FIG. 10 is a timing chart showing an example of a routine of this example embodiment. In FIG. 10, when the internal combustion engine is stopped, the precondition Ja is satisfied at timing t51, and the ECU 54 executes the first closed system leak diagnostic routine. At this time, the tank internal pressure Pfg is greater than β (i.e., Pfg>β) (i.e., NO in S106), so the ECU 54 closes the CCV 30 at timing t52 (S110) and opens the stop valve 22a at timing t53 (S112), thereby forming the second closed system.

Then after the ECU 54 turns on the second closed system leak diagnostic execution flag (S114), the precondition Jb is satisfied at timing t54 by the predetermined period of time described above passing (i.e., YES in S152). Also at timing t54, with respect to the tank internal pressure Pfg, Expression 1 is satisfied (i.e., YES in S156), but Expression 2 is not satisfied (i.e., NO in S157). The ECU 54 starts to count up the counter Cc (S172). Thereafter as well, Expression 2 continues to not be satisfied, and the counter Cc exceeds the reference count value C at timing t55 (i.e., YES in S174). Therefore, the ECU 54 outputs a diagnostic result indicating that the evaporation system is normal (S158). The ECU 54 then closes the stop valve 22a at timing t56 and opens the CCV 30 at timing t57.

The tank internal pressure sensor 42 may correspond to the tank internal pressure detecting device of the invention, the stop valve 22a may correspond to the first closed system forming device of the invention, and the CCV 30 and the purge control valve 38 may correspond to the second closed system forming device of the invention. The ECU 54 may correspond to the first closed system leak diagnostic unit and the second closed system leak diagnostic unit of the invention. Steps S100 to S108 and S118 to S124 of the first closed system leak diagnostic routine (FIG. 2) executed by the ECU 54 may correspond to processes of the first closed system leak diagnostic unit of the invention. Steps S110 to S114 of the first closed system leak diagnostic routine (FIG. 2) and steps S150 to S156, S160, S161, and S164 to S174 of the second closed system leak diagnostic routine (FIG. 9) may correspond to processes of the second closed system leak diagnostic unit of the invention.

[Effects]

In addition to the effects of the first example embodiment described above, the determination of Expression 2 above is also executed in the second closed system leak diagnostic routine (FIG. 9). Therefore, it is possible to prevent a decrease in the accuracy of leak detection due to machine differences as described above, so the leak diagnostic of the second closed system, i.e., the leak diagnostic of the canister 18, can be more accurate.

[Third Example Embodiment]

(Structure)

Figure 11:
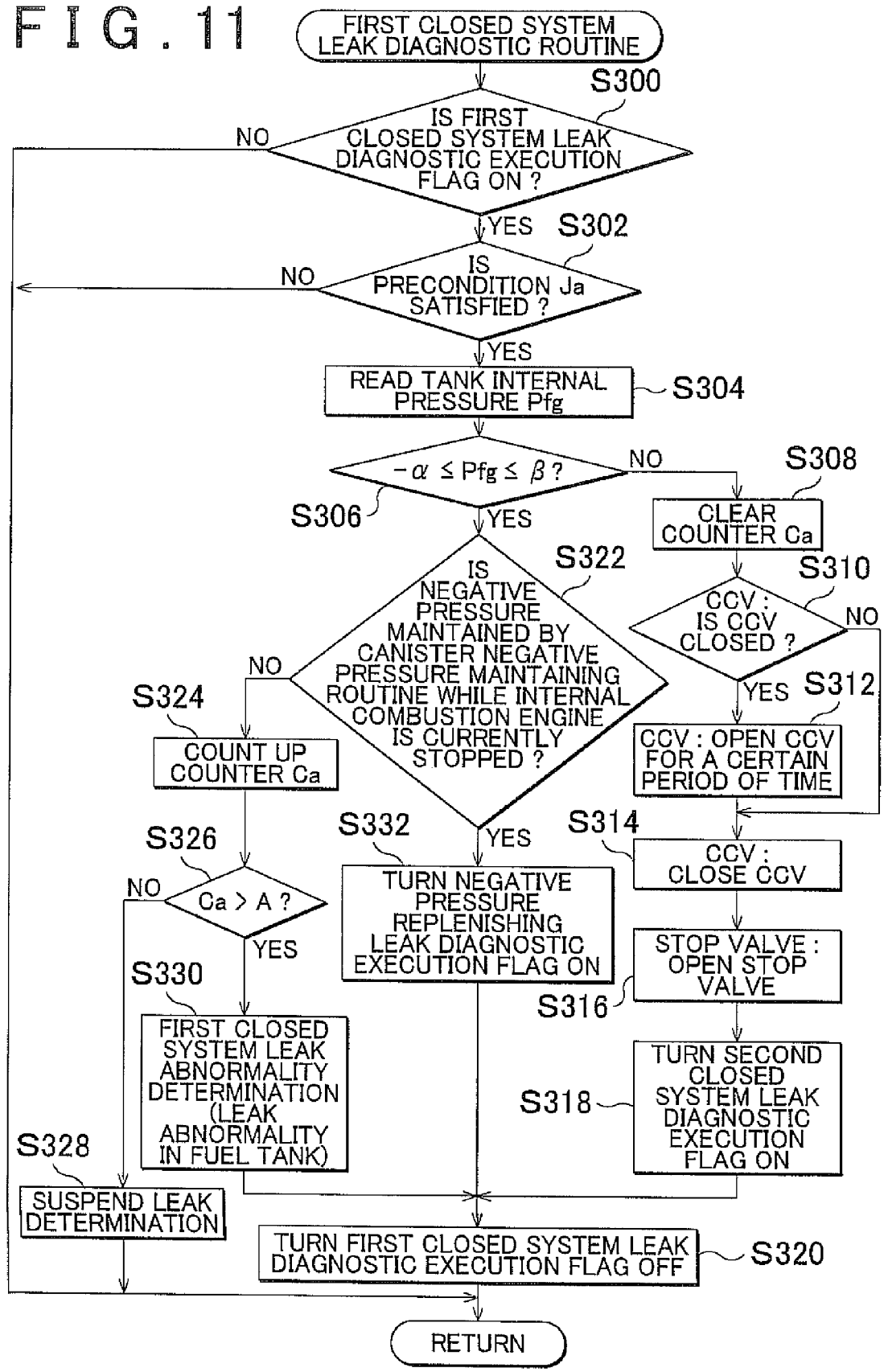
FIG. 11 is a flowchart illustrating a first closed system leak diagnostic routine according to a third example embodiment of the invention.

This example embodiment employs the structure shown in FIG. 1 described in the first example embodiment above. Here, the first closed system leak diagnostic routine shown in FIG. 11 is executed instead of the first closed system leak diagnostic routine (FIG. 2) described above in the first example embodiment. The second closed system leak diagnostic routine (FIG. 3) is executed as it is.

Figure 13:
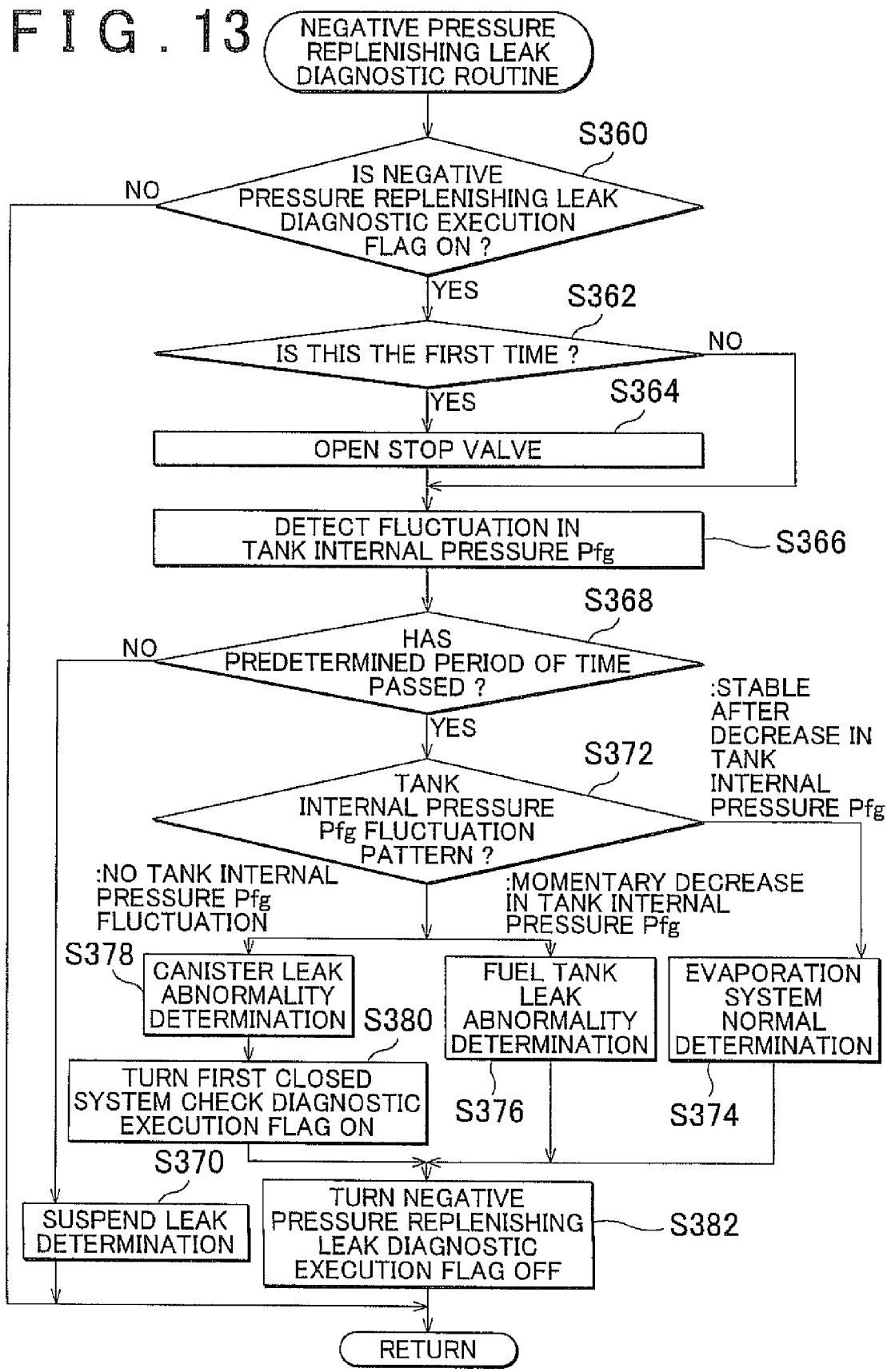
FIG. 13 is a flowchart illustrating a negative pressure replenishing leak diagnostic routine according to the third example embodiment.
Figure 14:
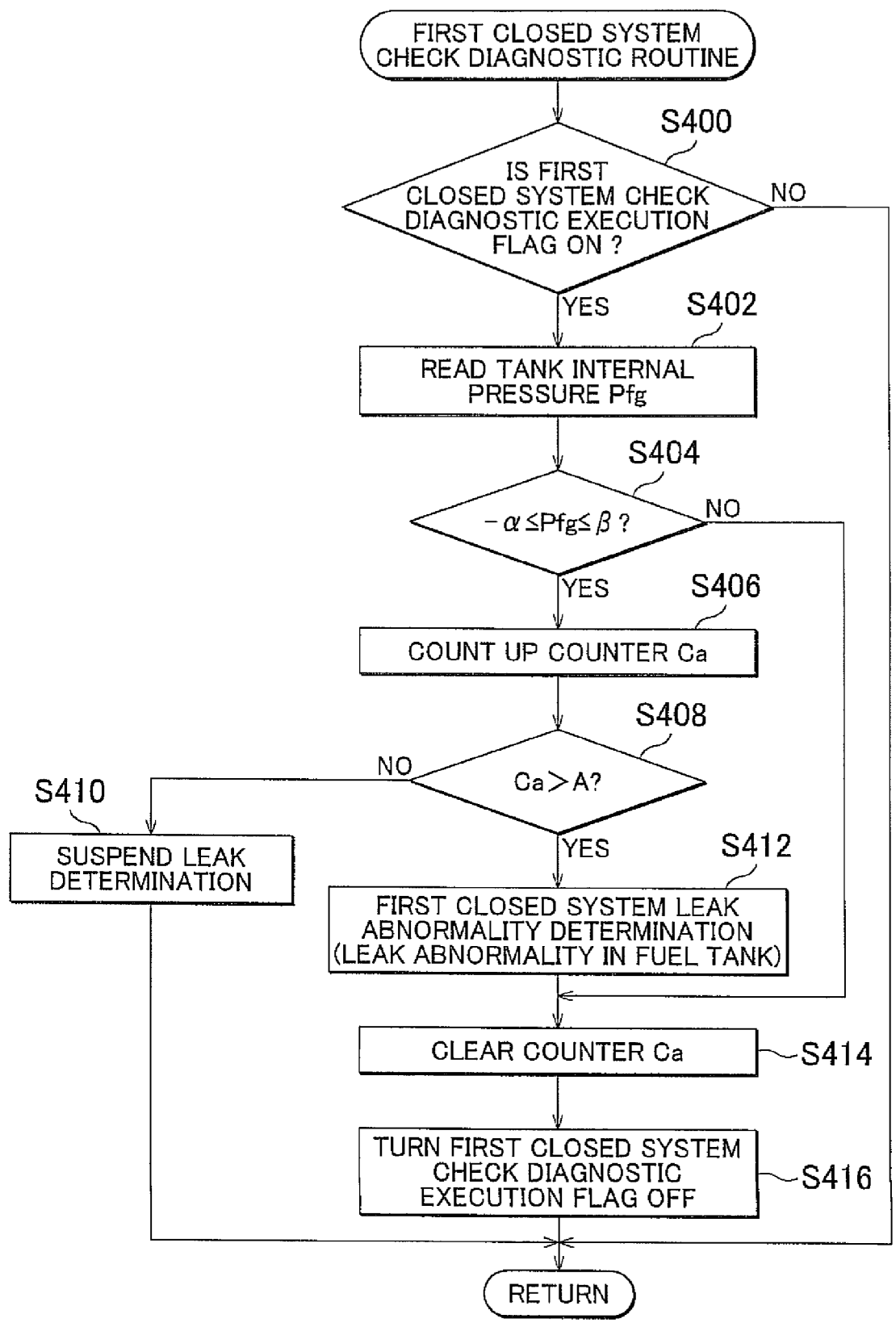
FIG. 14 is a flowchart illustrating a first closed system check diagnostic routine according to the third example embodiment.

The ECU 54 newly executes a routine to maintain canister negative pressure when the internal combustion engine is stopped (also simply referred to as a "canister negative pressure maintaining routine") (FIG. 12), a negative pressure replenishing leak diagnostic routine (FIG. 13), and a first closed system check diagnostic routine (FIG. 14). Accordingly, this third example embodiment will be described will reference to FIGS. 1, 3, 11, 12, 13, and 14.

(Operation)

The operation of this example embodiment based on the structure described above will be described together with the routines executed by the ECU 54.

The canister negative pressure maintaining routine (FIG. 12) will be described before the first closed system leak diagnostic routine (FIG. 11). The canister negative pressure maintaining routine (FIG. 12) is a routine that is repeated at regular cycles. First, the ECU 54 determines whether the IGSW 52 has been turned from ON to OFF while the internal combustion engine is operating (S340). If such an operation has not been performed (i.e., NO in S340), the ECU 54 immediately exits the routine.

If the driver of the vehicle has turned the IGSW 52 from ON to OFF in order to stop the internal combustion engine 2 (i.e., YES in S340), the ECU 54 closes the CCV 30 and the stop valve 22a (S342). Then the ECU 54 waits until the intake air pressure in the intake passage 34 downstream of the throttle valve 36 reaches the negative pressure peak, and then closes the purge control valve 38 (S344), after which the ECU 54 exits the routine.

The intake negative pressure can be calculated from the intake air amount GA detected by the airflow meter 46 and the engine speed NE. If an intake pressure sensor is provided, the ECU 54 determines the timing of the negative pressure peak based on the detection by the intake pressure sensor.

Even if the intake negative pressure is not calculated or directly detected, if the opening amount of the throttle valve 36 is at the minimum at the time that the IGSW 52 is turned OFF, the timing at which the IGSW 52 is turned off may be used as the timing of the intake negative pressure peak.

By closing the purge control valve 38, the inside of the canister 18 is closed off with the maximum intake negative pressure introduced, so thereafter while the internal combustion engine 2 is stopped, the space inside of the canister 18 is maintained in a negative pressure state.

Next, the first closed system leak diagnostic routine (FIG. 11) will be described. In the first closed system leak diagnostic routine (FIG. 11), a determination as to whether first closed system leak diagnostic execution flag is ON is made (S300), a determination as to whether the precondition Ja is satisfied is made (S302), the tank internal pressure Pfg is read (S304), and a determination as to whether Expression 1 described above is satisfied is made (S306). These steps (S300 to S306) are the same as steps S100 to S106 described with reference to FIG. 2.

Therefore, if the first closed system leak diagnostic execution flag is on (i.e., YES in S300) and the precondition Ja is satisfied (i.e., YES in S302), the ECU 54 reads the tank internal pressure Pfg using the tank internal pressure sensor 42 (S304), and determines whether the tank internal pressure Pfg is in the region near atmospheric pressure indicated by Expression 1 (S306).

Here, if the tank internal pressure Pfg is not in the region near atmospheric pressure (i.e., NO in S306), the ECU 54 clears the counter Ca (S308). Next, the ECU 54 determines whether the CCV 30 is closed by the canister negative pressure maintaining routine (FIG. 12) (S310).

Figure 12:
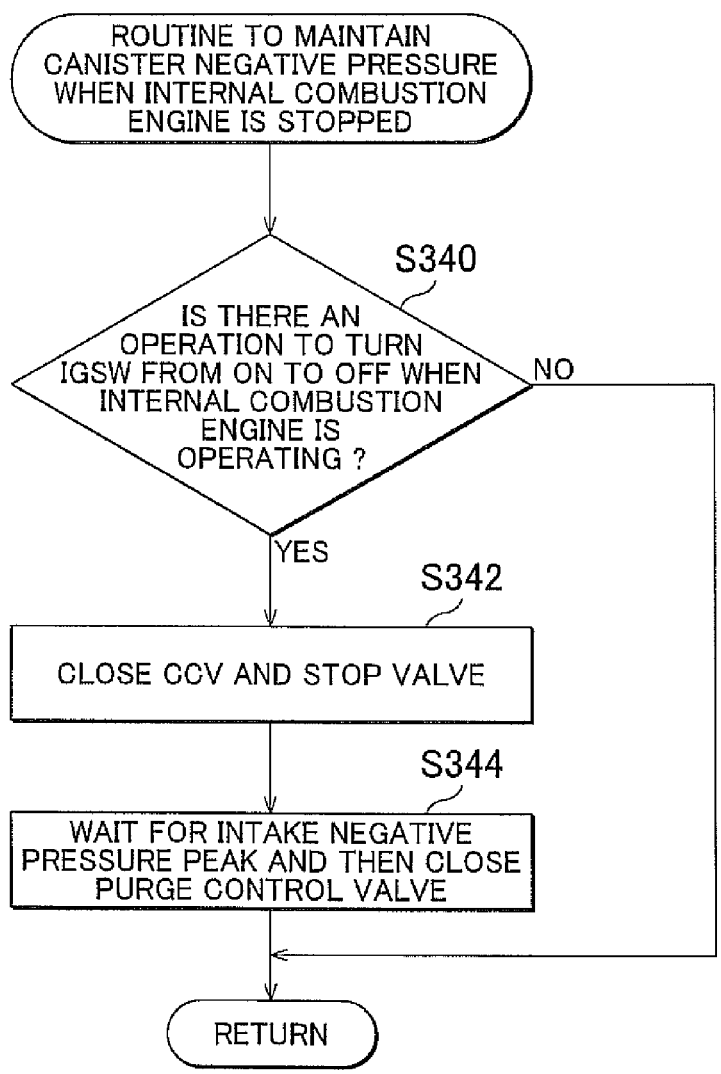
FIG. 12 is a flowchart illustrating a routine to maintain canister negative pressure when an internal combustion engine is stopped according to the third example embodiment.

If the CCV 30 is closed by the routine in FIG. 12 (i.e., YES in S310), the ECU 54 opens the CCV 30 for a certain period of time (S312). When the CCV 30 is opened for a certain period of time, outside air flows into the canister 18 that has been kept in a negative pressure state by the routine in FIG. 12. In this way, the internal space of the canister 18 comes to be at atmospheric pressure.

Then the ECU 54 closes the CCV 30 again (S314). As a result, the ECU 54 closes off the inside of the canister 18 from the outside air. If the CCV 30 is already open (i.e., NO in S310), the ECU 54 the inside of the canister 18 is at atmospheric pressure from the start, so the CCV 30 is immediately closed (S314).

After closing the CCV 30, the ECU 54 opens the stop valve 22a (S316). As a result, the fuel tank 10 becomes communicated with the canister 18 via the discharge passage 20 to create a combined space. The CCV 30 and the purge control valve 38 are already closed, so the fuel tank 10 and the canister 18 form a combined space that is closed off, such that the second closed system is formed.

Then the ECU 54 turns on the second closed system leak diagnostic execution flag (S318) and turns off the first closed system leak diagnostic execution flag (S320), and then exits the routine. As a result of turning the first closed system leak diagnostic execution flag off (S320), in the next execution cycle of the first closed system leak diagnostic routine (FIG. 11), the ECU 54 makes a determination of NO in step S300, so the leak diagnostic of the first closed system leak diagnostic routine (FIG. 11) will end. Also, as a result of turning the second closed system leak diagnostic execution flag on (S318), the ECU 54 will start the leak diagnostic in the second closed system leak diagnostic routine (FIG. 3) as described in the first example embodiment.

On the other hand, if the relationship in Expression 1 is satisfied at the beginning of the first closed system leak diagnostic routine (FIG. 11) (i.e., YES in S306), the ECU 54 then determines whether negative pressure is being maintained inside the canister 18 by the canister negative pressure maintaining routine (FIG. 12) (S322).

While the internal combustion engine is currently stopped, or if the internal combustion engine is being started, while the internal combustion engine had been stopped right before, negative pressure will not be maintained inside the canister 18 (i.e., NO in S322) unless steps S342 and S344 in the canister negative pressure maintaining routine (FIG. 12) are performed. In this case, the ECU 54 counts up the counter Ca (S324), determines whether the counter Ca exceeds the reference count value A (S326), suspends the leak diagnostic (S328), and determines that there is a leak abnormality in the first closed system (S330). The later steps (i.e., S324 to S330) are the same as steps S118 to S124 described with reference to FIG. 2.

If the counter Ca is greater than the reference count value A (i.e., if Ca>A) (i.e., YES in S326) and it is determined that there is a leak abnormality in the first closed system (S330), the ECU 54 turns off the first closed system leak diagnostic execution flag (S320) and exits the routine. Accordingly, it is evident that there is a leak abnormality in the first closed system, i.e., in the fuel tank 10.

While the internal combustion engine is currently stopped, or if the internal combustion engine is being started, while the internal combustion engine had been stopped right before, if steps S342 and S344 are performed in the canister negative pressure maintaining routine (FIG. 12), then negative pressure is being maintained inside of the canister 18 (i.e., YES in S322).

In this case, the ECU 54 turns on a negative pressure replenishing leak diagnostic execution flag (S332), and then turns off the first closed system leak diagnostic execution flag (S320), after which the ECU 54 exits the routine. As a result of the ECU 54 turning off the first closed system leak diagnostic execution flag (S320), the leak diagnostic of the first closed system leak diagnostic routine (FIG. 11) ends. Also, as a result of the ECU 54 turning on the negative pressure replenishing leak diagnostic execution flag (S332), the leak diagnostic with the negative pressure replenishing leak diagnostic routine (FIG. 13) starts.

In the negative pressure replenishing leak diagnostic routine (FIG. 13), the ECU 54 first determines whether a negative pressure replenishing leak diagnostic execution flag is turned on (S360). If the negative pressure replenishing leak diagnostic execution flag is not turned on (i.e., NO in S360), the ECU 54 exits the routine. A leak diagnostic is not performed with the negative pressure replenishing leak diagnostic routine (FIG. 13) while this is being repeated.

If the negative pressure replenishing leak diagnostic execution flag is turned on in step S332 of the first closed system leak diagnostic routine (FIG. 11) as described above (i.e., YES in S360), then the ECU 54 determines whether this is the first time with the negative pressure replenishing leak diagnostic execution flag turned on (S362). If it is the first time (i.e., YES in S362), the ECU 54 opens the stop valve 22a (S364). Then the ECU 54 uses the tank internal pressure sensor 42 to detect the fluctuation in the tank internal pressure Pfg that occurs when the stop valve 22a is opened (S366).

Then the ECU 54 determines whether a predetermined period of time has passed while the fluctuation in the tank internal pressure Pfg is being detected by the tank internal pressure sensor 42 (S368). This is the first time that the negative pressure replenishing leak diagnostic routine (FIG. 13) has been executed, so the fluctuation in the tank internal pressure Pfg has not been detected for the predetermined period of time (i.e., NO in S368), so the leak determination is suspended (S370), after which the ECU 54 exits the routine.

In the next execution cycle of the negative pressure replenishing leak diagnostic routine (FIG. 13), it is not the first time with the negative pressure replenishing leak diagnostic flag turned on, so the ECU 54 immediately skips to a step of detecting a fluctuation in the tank internal pressure Pfg (S366). Thereafter, the tank internal pressure Pfg fluctuation detecting step (S366) is continued until a predetermined period of time has passed.

When the ECU 54 opens the stop valve 22a in step S364, negative pressure is being maintained inside the canister 18. In contrast, the inside of the fuel tank 10 is in the region near atmospheric pressure indicated by Expression 1 and is near atmospheric pressure, so the difference to the positive pressure or negative pressure side with respect to atmospheric pressure is extremely small.

Therefore, when the stop valve 22a between the canister 18 and the fuel tank 10 is opened, negative pressure on the canister 18 side is introduced into the fuel tank 10 due to the differential pressure between the canister 18 and the fuel tank 10. The fluctuation in the tank internal pressure Pfg that occurs when the negative pressure is introduced is detected by the tank internal pressure sensor 42. A leak, or the absence thereof, in the canister 18 or the fuel tank 10 is reflected in the fluctuation in the tank internal pressure Pfg.

The determination as to whether the predetermined period of time has passed (S368) is a step for waiting until a fluctuation in the tank internal pressure Pfg appears. Therefore, while waiting for a fluctuation in the tank internal pressure Pfg to be detected (i.e., NO in S368), the ECU 54 suspends a leak determination (S370).

Figure 15A:
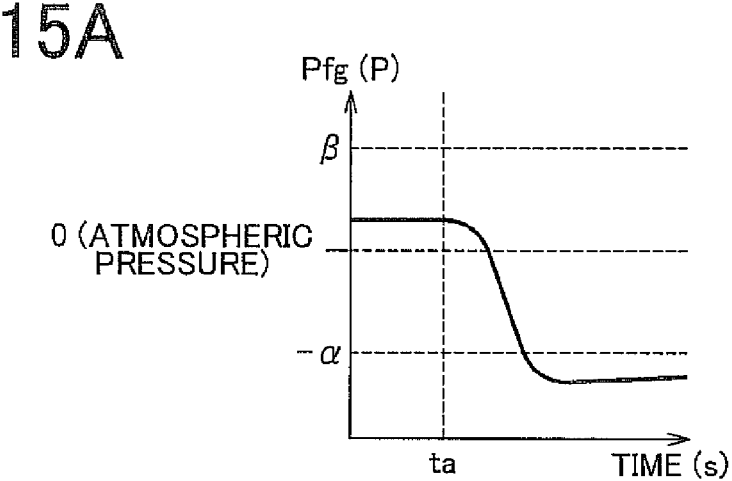
FIGS. 15A to 15C are timing charts showing one example of fluctuations in tank internal pressure in the routine of the third example embodiment.

If there is not a leak in either the fuel tank 10 or the canister 18, then a step occurs in the tank internal pressure Pfg due to the negative pressure being introduced from the canister 18 into the fuel tank 10 (ta), as shown in FIG. 15A, and for a least a while thereafter the pressure is slightly lower than the tank internal pressure Pfg before the stop valve 22a had been opened.

Figure 15B:
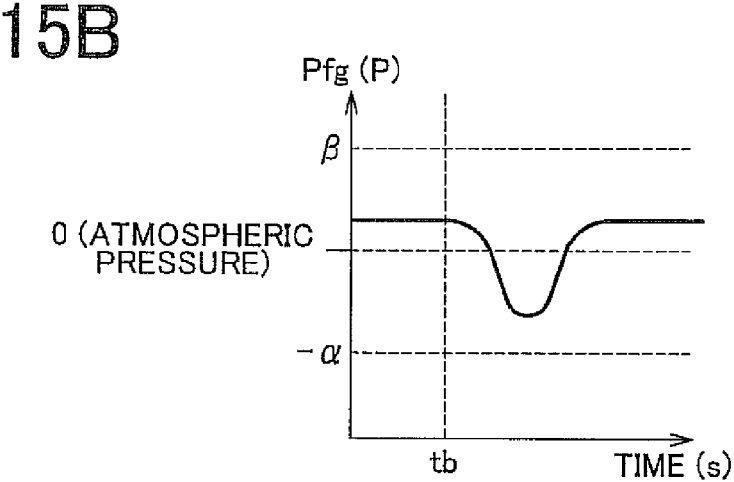

If there is a leak in the fuel tank 10 but not in the canister 18, then the tank internal pressure Pfg momentarily decreases due to the negative pressure being introduced from the canister 18 into the fuel tank 10 (tb), as shown in FIG. 15B. However, the tank internal pressure Pfg rapidly returns to its original pressure due to the leak in the fuel tank 10, and becomes the same pressure as the tank internal pressure Pfg before the stop valve 22a had been opened.

If there is no leak in the fuel tank 10 but there is a leak in the canister 18, or if there is a leak in both the fuel tank 10 and the canister 18, then even if the stop valve 22a is opened, the pressure inside of the canister 18 will actually already be at atmospheric pressure due to the leak, so negative pressure will not be introduced into the fuel tank 10. There will be no fluctuation in the tank internal pressure Pfg when negative pressure is introduced (tc), as shown in FIG. 15C.

Figure 15C:
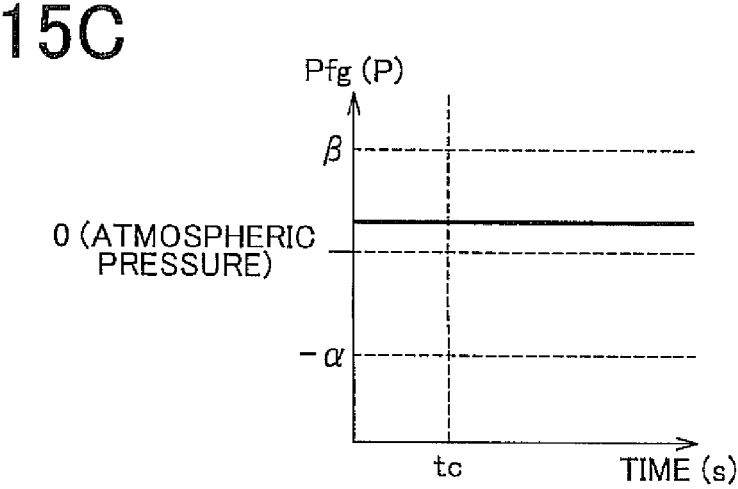

Once the predetermined period of time passes (i.e., YES in S368), the ECU 54 determines whether the fluctuation pattern that appears in the tank internal pressure Pfg within the predetermined period of time is one of the patterns in FIGS. 15A to 15C (S372).

Here, if the pattern is like that shown in FIG. 15A, there is no leak abnormality in the fuel tank 10 or the canister 18, so the ECU 54 determines that the evaporation system is normal (S374). If the pattern is like that shown in FIG. 15B, the ECU 54 determines that there is a leak abnormality in the fuel tank 10 (S376).

If the ECU 54 determines that the evaporation system is normal (S374) or determines that there is a leak abnormality in the fuel tank 10 (S376), the leak diagnostic of the fuel tank 10 and the canister 18 in the evaporation system 4 is complete, so the ECU 54 turns off the negative pressure replenishing leak diagnostic execution flag (S382). As a result of the negative pressure replenishing leak diagnostic execution flag being turned off (S382), a determination of NO is made in step S360 in the next execution cycle of the negative pressure replenishing leak diagnostic routine (FIG. 13), so the leak diagnostic of the negative pressure replenishing leak diagnostic routine (FIG. 13) ends.

If the pattern is like that shown in FIG. 15C, then it is evident that there is at least a leak abnormality in the canister 18, so the ECU 54 determines that there is a leak abnormality in the canister 18 (S378). However, if the pattern is like that shown in FIG. 15C, it is unclear whether there is a leak in the fuel tank 10. Therefore, the ECU 54 then turns on a first closed system check diagnostic execution flag (S380) after step S378. As a result, the ECU 54 executes a leak diagnostic separately with a first closed system check diagnostic routine (FIG. 14) that will be described later.

After turning on the first closed system check diagnostic execution flag (S380), the ECU 54 turns off the negative pressure replenishing leak diagnostic execution flag (S382), and the leak diagnostic of the negative pressure replenishing leak diagnostic routine (FIG. 13) ends.

With the ending of the negative pressure replenishing leak diagnostic as a result of the negative pressure replenishing leak diagnostic execution flag being turned off (S382), the ECU 54 closes the stop valve 22a and opens the CCV 30. Now the first closed system check diagnostic routine (FIG. 14) will be described. In this routine, the ECU 54 first determines whether a first closed system check diagnostic execution flag is turned on (S400).

If the first closed system check diagnostic execution flag is turned on as a result of step S380 in the negative pressure replenishing leak diagnostic routine (FIG. 13) as described above (i.e., YES in S400), the ECU 54 reads the tank internal pressure Pfg while the stop valve 22a is closed as described above, i.e., while the first closed system is formed (S402), and determines whether Expression 1 is satisfied with respect to the tank internal pressure Pfg (S404). These steps are similar to steps S104 and S106 described with reference to FIG. 2 in the first example embodiment above.

First, if Expression 1 is satisfied (i.e., YES in S404), the ECU 54 then counts up the counter Ca (S406). Then the ECU 54 determines whether the counter Ca is greater than the reference count value A (i.e., Ca>A) (S408). Here, at the beginning, the counter Ca is equal to or less than the reference count value A (i.e., Ca≤A) (i.e., NO in S408), so the ECU 54 suspends the leak determination (S410) and exits the routine.

Then when the counter Ca becomes greater than the reference count value A (i.e., when CA>A) while Expression 1 is satisfied (i.e., YES in S408), the ECU 54 determines that there is a leak abnormality in the first closed system (S412). That is, the ECU 54 determines that there is a leak abnormality in the fuel tank 10 as well.

Next, the ECU 54 clears the counter Ca (S414) and turns off the first closed system check diagnostic execution flag (S416), and then exits the routine. As a result of this step, in the next execution cycle, a determination of NO is made in step S400, and the leak diagnostic of the first closed system check diagnostic routine (FIG. 14) ends.

If Expression 1 becomes no longer satisfied while the counter Ca is equal to or less than the reference count value A (i.e., while Ca≤A) (i.e., NO in S404), it is evident that there is not a leak abnormality in the fuel tank 10. Therefore, the ECU 54 immediately clears the counter Ca (S414) and turns off the first closed system check diagnostic execution flag (S416), and then exits the routine.

As a result, even it is unclear whether there is a leak in the fuel tank 10 in the negative pressure replenishing leak diagnostic routine (FIG. 13), due to the fluctuation pattern of the tank internal pressure Pfg being similar to that in FIG. 15C, the ECU 54 is able to check whether there is a leak in the fuel tank 10 with the first closed system check diagnostic routine (FIG. 14) as described above.

The tank internal pressure sensor 42 may correspond to the tank internal pressure detecting device of the invention, the stop valve 22a may correspond to the first closed system forming device of the invention, and the CCV 30 and the purge control valve 38 may correspond to the second closed system forming device of the invention. The ECU 54 may correspond to the first closed system leak diagnostic unit, the second closed system leak diagnostic unit, the canister negative pressure maintaining unit, and the negative pressure replenishing leak diagnostic unit of the invention. Steps S300 to S308 and S324 to S330 of the first closed system leak diagnostic routine (FIG. 11) executed by the ECU 54 may correspond to processes of the first closed system leak diagnostic unit of the invention. Steps S310 to S318 of the first closed system leak diagnostic routine (FIG. 11) and steps S150 to S156, S160, and S164 to S170 of the second closed system leak diagnostic routine (FIG. 3) may correspond to processes of the second closed system leak diagnostic unit of the invention. The canister negative pressure maintaining routine (FIG. 12) may correspond to a process of the canister negative pressure maintaining unit of the invention, and the negative pressure replenishing leak diagnostic routine (FIG. 13) and the first closed system check diagnostic routine (FIG. 14) may correspond to the negative pressure replenishing leak diagnostic unit of the invention.

[Effects]

In addition to the effects of the first example embodiment described above, the negative pressure replenishing leak diagnostic routine (FIG. 13) is executed when the tank internal pressure Pfg is in the region near atmospheric pressure (i.e., in the range where Expression 1 is satisfied) in first closed system leak diagnostic routine (FIG. 11).

Accordingly, even if the tank internal pressure Pfg is in the region near atmospheric pressure when the first closed system leak diagnostic routine (FIG. 11) is performed, a leak diagnostic distinguishing between the fuel tank 10 and the canister 18 can be executed quickly by using the negative pressure maintained inside of the canister 18.

Furthermore, in the negative pressure replenishing leak diagnostic routine (FIG. 13) as well, if it is unclear whether there is a leak in the fuel tank 10, the first closed system check diagnostic routine (FIG. 14) may further be executed by step S380. As a result, a leak diagnostic for both the canister 18 and the fuel tank 10 can be reliably executed.

[Other Example Embodiments]

In the second closed system leak diagnostic routine (FIG. 9), having the AND condition that Expression 1 be satisfied (i.e., YES in S156) and that Expression 2 be satisfied (i.e., YES in S157) continue for a period of time that corresponds to the reference count value B is the condition for determining that there is a leak abnormality in the second closed system (S170). Instead, having Expression 2 continue to be satisfied (i.e., YES in S157) for a period of time that corresponds to the reference count value B, without including the condition of Expression 1, may also be the condition for determining that there is a leak abnormality in the second closed system (S170).

A leak diagnostic of the second closed system may be performed based on the rate of increase or the rate of decrease in the tank internal pressure Pfg that occurs when the stop valve 22a is opened, instead of step S157 in the second closed system leak diagnostic routine (FIG. 9). That is, a leak diagnostic of the second closed system may also be performed based on a change in the tank internal pressure Pfg when pressure in the fuel tank 10 is introduced into the canister 18.

If there is a leak in the canister 18, the absolute value of the rate of increase or the rate of decrease in the tank internal pressure Pfg that occurs when the stop valve 22a is opened is larger than it is when there is no leak. Performing the leak diagnostic based on this enables a determination as to whether there is a leak to be made without the determination being affected by machine differences as described above in the second example embodiment. Accordingly, a leak diagnostic of the second closed system, i.e., a leak diagnostic of the canister 18, is able to be more accurate.

The leak diagnostic condition according to the rate of increase or the rate of decrease in the tank internal pressure Pfg that occurs when the stop valve 22a is opened may also be used as an AND condition with steps S156 and S157 of the second closed system leak diagnostic routine (FIG. 9).

In the third example embodiment, the first closed system check diagnostic routine (FIG. 14) is executed as a result of step S380 in the negative pressure replenishing leak diagnostic routine (FIG. 13). As a modified example of the third example embodiment, step S380 may be omitted and the first closed system check diagnostic routine (FIG. 14) may not be executed.

It is determined that fuel vapor production in the fuel tank 10 is stable with the precondition Ja described in step S102 in the first closed system leak diagnostic routine (FIG. 2), but the degree of stability of fuel vapor production may also be determined based on the tank internal pressure Pfg detected by the tank internal pressure sensor 42.

For example, if the amount of fluctuation (i.e., the absolute value of change) in the tank internal pressure Pfg during a predetermined period of time (such as five minutes) is less than a reference value for determining the stability, it is determined that the fuel vapor production inside the fuel tank 10 is stable.

The fuel vapor production stability degree condition may be the precondition Ja, or it may be added as an AND condition to the precondition Ja described in step S102. Moreover, if the amount of fluctuation in the tank internal pressure Pfg is greater than the reference value, the leak diagnostic routine may be canceled, and then restarted after a predetermined period of time of several tens of minutes or several hours has passed.

The leak diagnostic accuracy can be even further improved by determining the stability degree of fuel vapor production based on the tank internal pressure Pfg detected by the tank internal pressure sensor 42. This is also the same for the precondition Jb described in step S152 of the second closed system leak diagnostic routine (FIG. 3).

Condition 1 of the precondition Ja may be that the current point in time be after the internal combustion engine has been stopped for an extended period of time (i.e., equal to or longer than a preset reference time) due to the vehicle being parked or the like. In other words, the condition may be that the current point in time be after a reference time has passed while the first closed system is formed.

Condition 2 of the precondition Ja may be that the coolant temperature THW detected by the coolant temperature sensor be equal to or less than a predetermined temperature (such as 35° C.). In other words, the condition may be that the current point in time be after a temperature that reflects a state of the internal combustion engine while the first closed system has reached a reference temperature.

This is also the same for the precondition Jb described in step S152 of the second closed system leak diagnostic routine (FIG. 3).

What is claimed is:

1. An evaporation system leak diagnostic apparatus that purges fuel vapor from a fuel tank into an intake system of an internal combustion engine via a canister, comprising:
   a tank internal pressure detecting device that detects a tank internal pressure of the fuel tank;
   a first closed system forming device that forms a first closed system in which the fuel tank is closed off;
   a second closed system forming device that forms a second closed system in which the canister and the fuel tank form a combined space that is closed off;
   a first closed system leak diagnostic unit that executes a leak diagnostic on the first closed system based on the tank internal pressure detected by the tank internal pressure detecting device, after a reference time has passed while the first closed system is formed with the first closed system forming device, and during a period of time from an on operation of an ignition switch until right before purging is first executed; and a second closed system leak diagnostic unit that introduces pressure in the first closed system into the second closed system by forming the second closed system with the second closed system forming device, and executes a leak diagnostic on the second closed system based on the tank internal pressure detected by the tank internal pressure detecting device after the period of time until right before the purging is first executed, after the leak diagnostic by the first closed system leak diagnostic unit.

2. The evaporation system leak diagnostic apparatus according to claim 1, wherein the first closed system leak diagnostic unit executes a leak diagnostic on the first closed system based on the tank internal pressure detected by the tank internal pressure detecting device, after a reference time has passed while the first closed system is formed with the first closed system forming device.

3. The evaporation system leak diagnostic apparatus according to claim 1, wherein the first closed system leak diagnostic unit executes a leak diagnostic on the first closed system based on the tank internal pressure detected by the tank internal pressure detecting device, after a temperature that reflects a state of the internal combustion engine while the first closed system is formed with the first closed system forming device has reached a reference temperature.

4. The evaporation system leak diagnostic apparatus according to claim 1, wherein the second closed system leak diagnostic unit outputs a leak diagnostic result for the second closed system as a leak diagnostic result of a portion in the second closed system excluding the first closed system.

5. The evaporation system leak diagnostic apparatus according to claim 1, wherein the second closed system leak diagnostic unit does not perform a leak diagnostic on the second closed system when it is diagnosed by the first closed system leak diagnostic unit that the first closed system has a leak abnormality.

6. The evaporation system leak diagnostic apparatus according to claim 1, wherein the first closed system leak diagnostic unit and the second closed system leak diagnostic unit execute a leak diagnostic by determining whether the tank internal pressure is in a region near atmospheric pressure that has been set to include a pressure value of atmospheric pressure.

7. The evaporation system leak diagnostic apparatus according to claim 6, further comprising:

a canister negative pressure maintaining unit that closes off the canister in a state in which negative pressure of the intake system has been introduced into the canister right before the internal combustion engine is stopped, and maintains the negative pressure generated in the intake system in the canister even after the internal combustion engine is stopped; and a negative pressure replenishing leak diagnostic unit that, when it is determined by the leak diagnostic by the first closed system leak diagnostic unit that the tank internal pressure is in the region near atmospheric pressure, executes a leak diagnostic on at least the canister based on the tank internal pressure detected by the tank internal pressure detecting device, using the negative pressure maintained in the canister by the canister negative pressure maintaining unit.

8. The evaporation system leak diagnostic apparatus according to claim 7, wherein the negative pressure replenishing leak diagnostic unit executes a leak diagnostic on the canister based on a fluctuation pattern of the tank internal pressure that occurs in response to a switch from the first closed system to the second closed system.

9. The evaporation system leak diagnostic apparatus according to claim 8, wherein when the fluctuation pattern is non-fluctuating, the negative pressure replenishing leak diagnostic unit forms the first closed system with the first closed system forming device and again executes a leak diagnostic on the first closed system.

10. An evaporation system leak diagnostic apparatus that purges fuel vapor from a fuel tank into an intake system of an internal combustion engine via a canister, comprising:

a tank internal pressure detecting device that detects a tank internal pressure of the fuel tank;

a first closed system forming device that forms a first closed system in which the fuel tank is closed off;

a second closed system forming device that forms a second closed system in which the canister and the fuel tank form a combined space that is closed off;

a first closed system leak diagnostic unit that executes a leak diagnostic on the first closed system based on the tank internal pressure detected by the tank internal pressure detecting device while the first closed system is formed with the first closed system forming device; and a second closed system leak diagnostic unit that introduces pressure in the first closed system into the second closed system by forming the second closed system with the second closed system forming device, and executes a leak diagnostic on the second closed system after the leak diagnostic by the first closed system leak diagnostic unit, the second closed system leak diagnostic unit executes the leak diagnostic based on a determination regarding a change in the tank internal pressure detected by the tank internal pressure detecting device, before and after the second closed system is formed.

11. The evaporation system leak diagnostic apparatus according to claim 10, wherein the second closed system leak diagnostic unit makes the determination regarding a change in the tank internal pressure by comparing the change in the tank internal pressure before and after the second closed system is formed, with a pressure change determining threshold value set based on a spatial volume change from the first closed system to the second closed system.

12. The evaporation system leak diagnostic apparatus according to claim 10, wherein the second closed system leak diagnostic unit executes a leak diagnostic based on a determination of whether the tank internal pressure when the second closed system is formed is in a region near atmospheric pressure that has been set to include a pressure value of atmospheric pressure.

13. The evaporation system leak diagnostic apparatus according to claim 12, wherein the second closed system leak diagnostic unit makes the determination regarding the change in the tank internal pressure by comparing the change in the tank internal pressure before and after the second closed system is formed, with a pressure change determining threshold value set based on a spatial volume change from the first closed system to the second closed system.

14. An evaporation system leak diagnostic apparatus that purges fuel vapor from a fuel tank into an intake system of an internal combustion engine via a canister, comprising:

a tank internal pressure detecting device that detects a tank internal pressure of the fuel tank;

a first closed system forming device that forms a first closed system in which the fuel tank is closed off;

a second closed system forming device that forms a second closed system in which the canister and the fuel tank form a combined space that is closed off;

a first closed system leak diagnostic unit that executes a leak diagnostic on the first closed system based on the tank internal pressure detected by the tank internal pressure detecting device, while the first closed system is formed with the first closed system forming device and an ignition switch is off, after a temperature that reflects a state of the internal combustion engine has reached a reference temperature; and a second closed system leak diagnostic unit that introduces pressure in the first closed system into the second closed system by forming the second closed system with the second closed system forming device, and executes a leak diagnostic on the second closed system after the leak diagnostic by the first closed system leak diagnostic unit, the second closed system leak diagnostic unit executes the leak diagnostic based on the tank internal pressure detected by the tank internal pressure detecting device while the ignition switch is off.

* * * * *